(12) United States Patent
Tsuji

(10) Patent No.: US 11,335,011 B2
(45) Date of Patent: May 17, 2022

(54) OBJECT DETECTION DEVICE, OBJECT DETECTION SYSTEM, OBJECT DETECTION METHOD, AND NON-TRANSITORY COMPUTER-READABLE MEDIUM STORING PROGRAM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 16/980,790

(22) PCT Filed: Mar. 16, 2018

(86) PCT No.: PCT/JP2018/010422
§ 371 (c)(1),
(2) Date: Sep. 14, 2020

(87) PCT Pub. No.: WO2019/176084
PCT Pub. Date: Sep. 19, 2019

(65) Prior Publication Data
US 2020/0410694 A1    Dec. 31, 2020

(51) Int. Cl.
*G06T 7/246*     (2017.01)
*G01P 3/68*      (2006.01)

(52) U.S. Cl.
CPC ............. *G06T 7/248* (2017.01); *G01P 3/68* (2013.01)

(58) Field of Classification Search
None
See application file for complete search history.

(56) References Cited

U.S. PATENT DOCUMENTS

| 4,696,567 | A | 9/1987 | Ruger et al. |
| 9,129,181 | B1 * | 9/2015 | Nathan ................ G06K 9/3241 |
| 2004/0221790 | A1 | 11/2004 | Sinclair et al. |
| 2018/0357772 | A1 * | 12/2018 | Takemura .......... G06K 9/00369 |

FOREIGN PATENT DOCUMENTS

| JP | H05-312818 A | 11/1993 |
| JP | H06-213632 A | 8/1994 |
| JP | 2004-191095 A | 7/2004 |
| JP | 2011-39792 A | 2/2011 |
| JP | 2011-64499 A | 3/2011 |
| JP | 2011-186526 A | 9/2011 |

OTHER PUBLICATIONS

International Search Report dated Jun. 5, 2018, in corresponding PCT International Application.

* cited by examiner

*Primary Examiner* — Matthew C Bella
*Assistant Examiner* — Brian D Shin

(57) ABSTRACT

Provided is an object detection device capable of accurately calculating a movement parameter related to the movement of an object. An object detection device (1) includes a feature extraction unit (2) and a calculation unit (4). When an object passes each of a plurality of irradiation areas of irradiation light from a first sensor and a second sensor, which are configured to detect a feature of a part of a surface of an object by applying irradiation light, the feature extraction unit (2) extracts features of the object in the plurality of irradiation areas. The calculation unit (4) calculates a movement parameter of the object between the plurality of irradiation areas when a difference between the features respectively extracted in the plurality of irradiation areas falls below a predetermined first threshold.

20 Claims, 14 Drawing Sheets

OBJECT DETECTION DEVICE, OBJECT DETECTION SYSTEM, OBJECT DETECTION METHOD, AND NON-TRANSITORY COMPUTER-READABLE MEDIUM STORING PROGRAM

CROSS-REFERENCE TO RELATED PATENT APPLICATIONS

This application is a National Stage Entry of International Application No. PCT/JP2018/010422, filed Mar. 16, 2018. The entire contents of the above-referenced application is expressly incorporated herein by reference.

TECHNICAL FIELD

The present invention relates to an object detection device, an object detection system, an object detection method, and a program, and, particularly, relates to an object detection device, an object detection system, an object detection method, and a program that detect an object by using a sensor.

BACKGROUND ART

A technique that detects an object by using a sensor is known. In regard to this technique. Patent Literature 1 discloses a pedestrian trajectory extraction device that detects position coordinates of a pedestrian by a plurality of laser sensors, integrates the detected data by coordinate transformation in a server, and thereby extracts the trajectory of the pedestrian in real time and over a wide range. The pedestrian trajectory extraction device according to Patent Literature 1 controls a plurality of clients provided in correspondence with a plurality of laser sensors that detect the position of a pedestrian or an object. The pedestrian trajectory extraction device includes a synchronization means, an integration means, and a trajectory extraction means. The synchronization means synchronizes detection time of the plurality of laser sensors. The integration means integrates the position coordinates of a pedestrian extracted by the plurality of clients into one coordinate system from data detected by the plurality of laser sensors. The trajectory extraction means extracts the movement trajectory of the pedestrian from the position coordinates of the pedestrian obtained by the integration means.

Patent Literature 2 discloses an image measurement device that measures an image of an object. The image measurement device according to Patent Literature 2 includes first and second imaging means placed in at least different viewing locations, a three-dimensional position detection means, a movement model data storage means, and an action recognition means. The three-dimensional position detection means detects a three-dimensional position of a feature point in an object from output images of the first and second imaging means. The movement model data storage means stores data related to each action and posture of a movement model of an object. The action recognition means compares, in time series, the detected three-dimensional position or its temporal change of the feature point in an object with data related to the action and posture of the object stored in the movement model data storage means, and thereby recognizes the action and posture of the object.

CITATION LIST

Patent Literature

PTL1: Japanese Unexamined Patent Application Publication No. 2004-191095

PTL2: Japanese Unexamined Patent Application Publication No. H06-213632

SUMMARY OF INVENTION

Technical Problem

In the above-described patent literatures, the action (movement trajectory) of an object is detected by using a plurality of sensors (imaging means). In the case of detecting the action of an object by using a plurality of sensors, the object to be detected by the plurality of sensors needs to be the same. If objects detected by the plurality of sensors are possibly different, there is a possibility that the action of an object is wrongly detected due to a mix-up between objects. The above-described patent literatures disclose nothing about detecting whether objects detected by a plurality of sensors are the same or not. Thus, according to the above-described patent literatures, there is a possibility that the action of an object is wrongly detected in the environment where a plurality of objects can exist.

The present disclosure has been accomplished to solve the above problem, and an object of the present disclosure is thus to provide an object detection device, an object detection system, an object detection method, and a program capable of accurately calculating a movement parameter related to the movement of an object.

Solution to Problem

An object detection device according to the present disclosure includes a feature extraction means for extracting features of an object in a plurality of irradiation areas of irradiation light from at least one sensor when the object passes each of the plurality of irradiation areas, the at least one sensor being configured to detect a feature of a part of a surface of an object by applying irradiation light, and a calculation means for calculating a movement parameter related to movement of the object between the plurality of irradiation areas when a difference between the features respectively extracted in the plurality of irradiation areas falls below a predetermined first threshold.

An object detection system according to the present disclosure includes at least one sensor configured to detect a feature of a part of a surface of an object by applying irradiation light, and an object detection device, wherein the object detection device includes a feature extraction means for extracting features of an object in a plurality of irradiation areas of irradiation light from at least one sensor when the object passes each of the plurality of irradiation areas, the at least one sensor being configured to detect a feature of a part of a surface of an object by applying irradiation light, and a calculation means for calculating a movement parameter related to movement of the object between the plurality of irradiation areas when a difference between the features respectively extracted in the plurality of irradiation areas falls below a predetermined first threshold.

An object detection method according to the present disclosure includes extracting features of an object in a plurality of irradiation areas of irradiation light from at least one sensor when the object passes each of the plurality of irradiation areas, the at least one sensor being configured to detect a feature of a part of a surface of an object by applying irradiation light, and calculating a movement parameter related to movement of the object between the plurality of irradiation areas when a difference between the features respectively extracted in the plurality of irradiation areas falls below a predetermined first threshold.

A program according to the present disclosure causes a computer to perform a step of extracting features of an object in a plurality of irradiation areas of irradiation light from at least one sensor when the object passes each of the plurality of irradiation areas, the at least one sensor being configured to detect a feature of a part of a surface of an object by applying irradiation light, and a step of calculating a movement parameter related to movement of the object between the plurality of irradiation areas when a difference between the features respectively extracted in the plurality of irradiation areas falls below a predetermined first threshold.

Advantageous Effects of Invention

According to the present disclosure, there are provided an object detection device, an object detection system, an object detection method, and a program capable of accurately calculating a movement parameter related to the movement of an object.

DESCRIPTION OF EMBODIMENTS

Overview of Example Embodiment According to Present Disclosure

Figure 1:
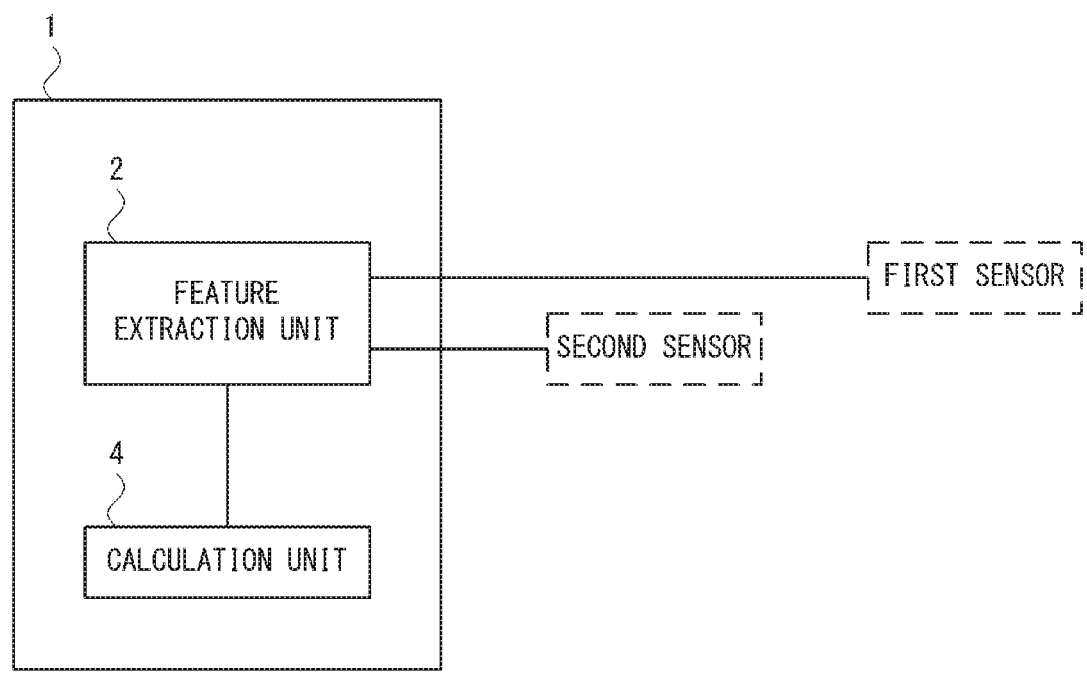
FIG. 1 is a view showing the overview of an object detection device according to an example embodiment of the present disclosure.

Prior to describing example embodiments of the present disclosure, the overview of an example embodiment according to the present disclosure is described. FIG. 1 is a view showing the overview of an object detection device 1 according to an example embodiment of the present disclosure.

The object detection device 1 includes a feature extraction unit 2 that functions as a feature extraction means, and a calculation unit 4 that functions as a calculation means. The feature extraction unit 2 extracts features of an object in a plurality of irradiation areas of irradiation light from a first sensor and a second sensor, which are configured to detect a feature of a part of the surface of an object by applying irradiation light, when the object passes each of the irradiation areas. The calculation unit 4 calculates a movement parameter of the object between the plurality of irradiation areas when a difference between the features respectively extracted in the plurality of irradiation areas falls below a predetermined first threshold.

The irradiation light is laser light, for example, though not limited thereto. Further, the movement parameter is a parameter related to the movement of an object. The movement parameter is the moving direction and the moving speed of an object, for example, though not limited thereto. Further, although two sensors (the first sensor and the second sensor) are shown in FIG. 1, the number of sensors may be one, or three or more. In the case where the number of sensors is one, one sensor may have a plurality of irradiation areas. For example, one sensor may form a first irradiation area at time t1 and form a second irradiation area at time 2.

Since the object detection device 1 according to this example embodiment calculates the movement parameter by using features of an object, it is able to calculate the movement parameter when the same position on the same object passes a plurality of irradiation areas. Specifically, the object detection device 1 according to this example embodiment is able to identify an object by using features of the object when calculating the movement parameter. The object detection device 1 according to this example embodiment is thereby capable of accurately calculating the movement parameter without mixing up between objects.

It should be noted that use of an object detection method performed by the object detection device 1 also enables accurate calculation of the movement parameter without mixing up between objects. Further, use of a program capable of implementing the object detection method also enables accurate calculation of the movement parameter without mixing up between objects. Furthermore, use of an object detection system that includes the object detection device 1 and at least one sensor also enables accurate calculation of the movement parameter without mixing up between objects.

First Example Embodiment

A first example embodiment is described hereinafter.

Figure 2:
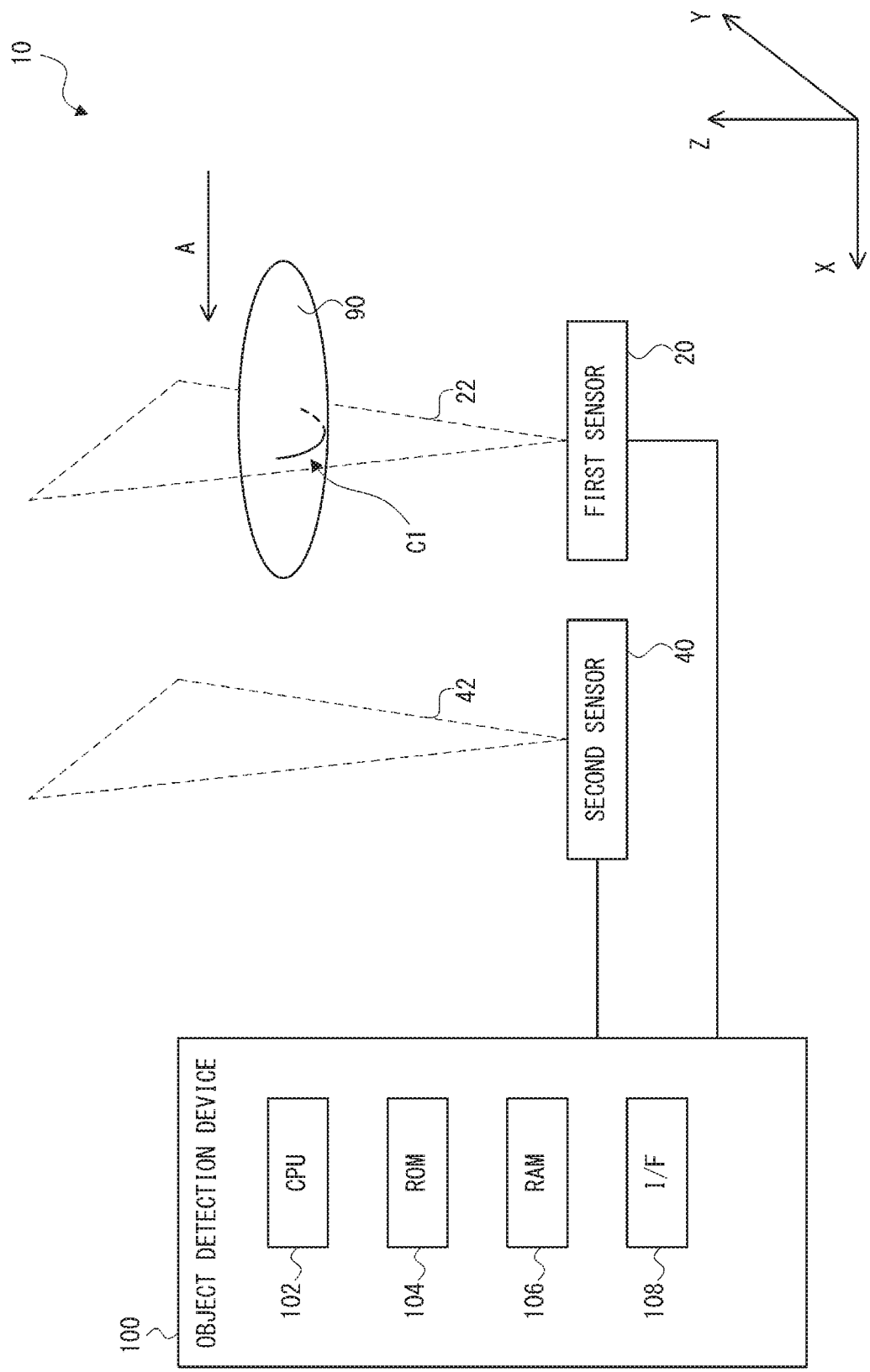
FIG. 2 is a view showing the configuration of an object detection system according to a first example embodiment.

FIG. 2 is a view showing the configuration of an object detection system 10 according to the first example embodiment. The object detection system 10 according to the first example embodiment includes a first sensor 20, a second sensor 40, and an object detection device 100. The first sensor 20 and the second sensor 40 are respectively equivalent of the first sensor and the second sensor shown in FIG. 1. The first sensor 20 and the second sensor 40 are three-dimensional sensors such as a 3D scanner, a range sensor, a depth sensor, a distance sensor, and a 3D camera (stereo camera) capable of measuring the distance to an object. The first sensor 20 and the second sensor 40 are LIDAR (Light Detection and Ranging) or the like, for example. Further, the first sensor 20 and the second sensor 40 are able to recognize the three-dimensional coordinates in the three-dimensional space where the object detection system 10 is located. Note that the three-dimensional space may be represented by the Cartesian coordinate system or represented by the polar coordinate system. The following description shows an example where the three-dimensional space is represented by the (X, Y, Z) Cartesian coordinate system.

Further, although the first sensor 20 and the second sensor 40 emit laser light in the upward direction from below an object 90 in this example embodiment, the present invention is not limited to this structure. The direction of emitting laser light from the first sensor 20 and the second sensor 40 is not limited to upward, and it is arbitrary. Further, although the number of the first sensor 20 and the second sensor 40 is one each in this example embodiment, the present invention is not limited to this structure. A plurality of first sensors 20 and a plurality of second sensors 40 may be provided. When a plurality of first sensors 20 are provided, laser light may be applied both from above and below the object 90 to enable detection of not only the lower shape of the object 90 but also the upper shape of the object 90. The same applies to the second sensor 40.

The first sensor 20 is configured to detect a feature of a part of the surface of an object 90 by applying irradiation light. To be specific, the first sensor 20 measures the distance from the first sensor 20 to each point on the object 90. Then, the first sensor 20 generates distance data indicating the measured distance. The first sensor 20 generates distance image data indicating a distance image (point cloud) as the distance data. Specifically, the distance data represents, three-dimensionally, a point group on the surface of the object 90 indicating the distance from the first sensor 20.

The first sensor 20 scans irradiation light such as laser light over a first irradiation area 22 (first irradiation area), which is a certain range, and receives reflected light of the irradiation light that has been reflected on the object 90. The first sensor 20 then calculates the distance to the object 90 from a difference between the time of transmission and the time of reception. After that, the first sensor 20 calculates the three-dimensional coordinates (X, Y, Z) of the reflected position of laser light on the object 90 from the three-dimensional position coordinates of the first sensor 20, the irradiation direction of laser light, and the distance to the object 90.

The first irradiation area 22 of the first sensor 20 may have a planar shape (or a pyramid shape). In the following description, it is assumed that the first irradiation area 22 is formed on a plane perpendicular to the X-axis. In other words, the axis perpendicular to the first irradiation area 22 is the X-axis. The vertical direction is the Z-axis, and the axis perpendicular to the X-axis and the Z-axis is the Y-axis. In this manner, the first sensor 20 forms a laser wall capable of detecting the object 90 that has passed the first irradiation area 22 and entered on the side of the second sensor 40.

The first sensor 20 detects the three-dimensional coordinates (X, Y, Z) of the position where the surface of the object 90 is irradiated with laser light in the first irradiation area 22 when the object 90 passes the first irradiation area 22. Thus, a coordinate data group (point group) corresponding to the positions on the object 90 irradiated by the first sensor 20 can form a curved line on a plane perpendicular to the X-axis as shown by the arrow C1.

The second sensor 40 is capable of detecting the shape of the object 90 that has passed a second irradiation area 42 (second irradiation area) of the second sensor 40 by a method similar to that of the first sensor 20. Specifically, the second sensor 40 scans irradiation light such as laser light over the second irradiation area 42, which is a certain range, and receives reflected light of the irradiation light that has been reflected on the object 90. The second sensor 40 then calculates the distance to the object 90 from a difference between the time of transmission and the time of reception. The second sensor 40 thereby calculates the three-dimensional coordinates (X, Y, Z) of the reflected position of laser light on the object 90. The second irradiation area 42 of the second sensor 40 may have a planar shape (or a pyramid shape). Note that, although the second irradiation area 42 is formed on a plane perpendicular to the X-axis, the present invention is not limited to this structure. The second irradiation area 42 is not necessarily parallel to the first irradiation area 22.

The object detection device 100 is a computer, for example. The object detection device 100 is connected for communication with the first sensor 20 and the second sensor 40 by wired or wireless connection. As described later, the object detection device 100 extracts feature data indicating a feature of the object 90 in the first irradiation area 22 when the object 90 passes the first irradiation area 22 of the first sensor 20. Further, the object detection device 100 extracts feature data indicating a feature of the object 90 in the second irradiation area 42 when the object 90 passes the second irradiation area 42 of the second sensor 40. Then, when a difference between the feature data extracted in the first irradiation area 22 and the feature data extracted in the second irradiation area 42 falls below a predetermined threshold, the object detection device 100 calculates the movement parameter (moving direction and moving speed) of the object 90. Note that the case where the object 90 passes the first irradiation area 22 first and then passes the second irradiation area 42 is described below. However, the object 90 may pass the second irradiation area 42 first and then pass the first irradiation area 22.

The object detection device 100 includes, as main hardware components, a CPU (Central Processing Unit) 102, a ROM (Read Only Memory) 104, a RAM (Random Access Memory) 106, and an interface unit 108 (IF; Interface). The CPU 102, the ROM 104, the RAM 106 and the interface unit 108 are connected with each other through a data bus or the like.

The CPU 102 has a function as an arithmetic device that performs control processing, arithmetic processing and so on. The ROM 104 has a function for storing a control program, an arithmetic program and so on to be executed by the CPU 102. The RAM 106 has a function for temporarily storing processing data or the like. The interface unit 108 inputs and outputs signals from and to the outside by wired or wireless connection. Further, the interface unit 108 receives a data input operation by a user and displays information to the user.

Figure 3:
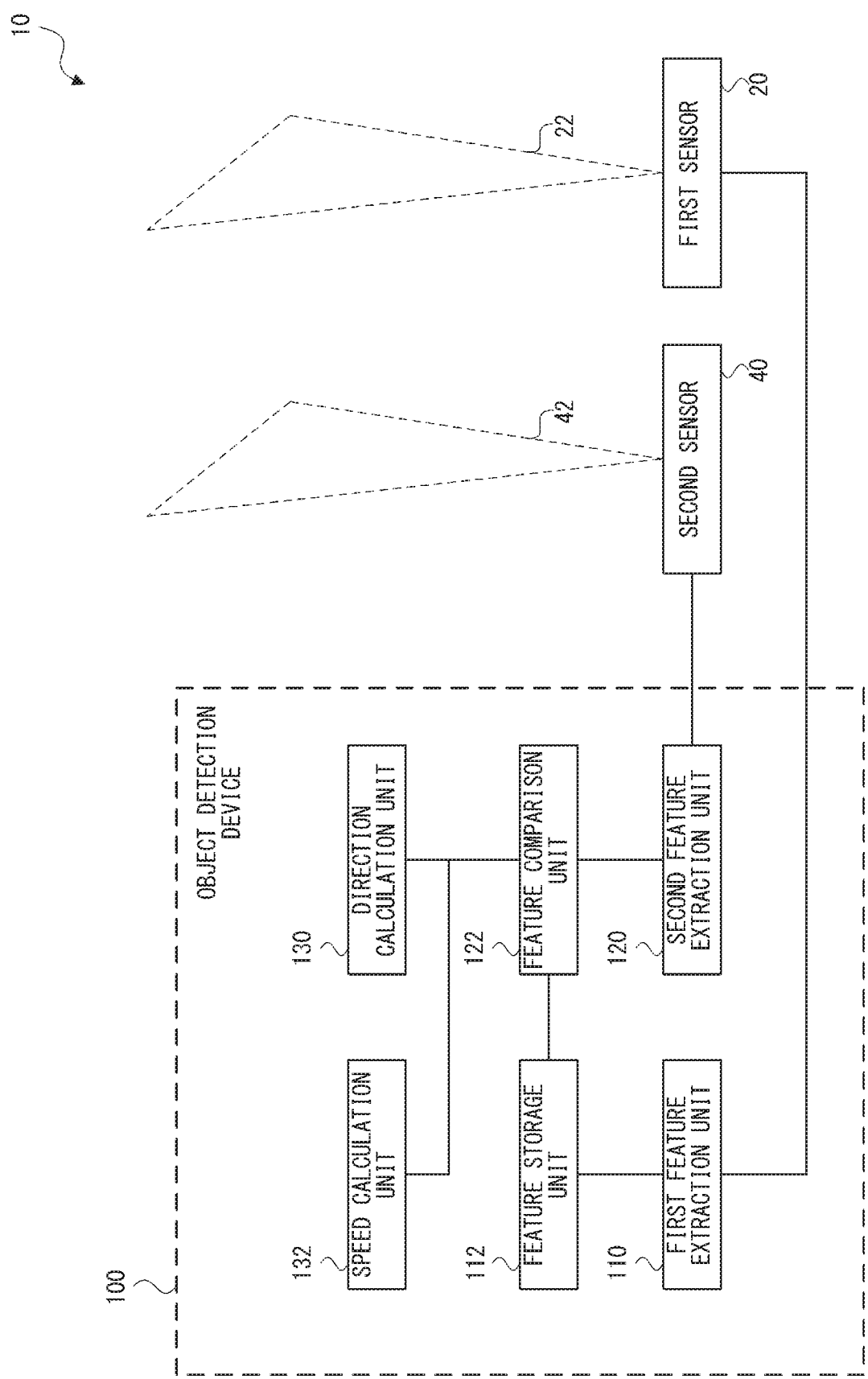
FIG. 3 is a functional block diagram showing the object detection system according to the first example embodiment.

FIG. 3 is a functional block diagram showing the object detection system 10 according to the first example embodiment. The object detection device 100 includes a first feature extraction unit 110, a feature storage unit 112, a second feature extraction unit 120, a feature comparison unit 122, a direction calculation unit 130, and a speed calculation unit 132 (which are referred to hereinafter as "each element"). The first feature extraction unit 110 and the second feature extraction unit 120 function as a feature extraction means. Further, the feature storage unit 112, the feature comparison unit 122, the direction calculation unit 130, and the speed calculation unit 132 function as a feature storage means, a feature comparison means, a direction calculation means, and a speed calculation means, respectively.

Each element can be implemented when the CPU 102 executes a program stored in the ROM 104, for example. Further, a necessary program may be recorded on an arbitrary nonvolatile recording medium and installed according to need. Note that each element is not limited to be implemented by software as described above, and it may be implemented by hardware such as some sort of circuit element. Further, one or more of the above-described elements may be implemented by physically separate hardware. Specific functions of each element are described later.

Figure 4:
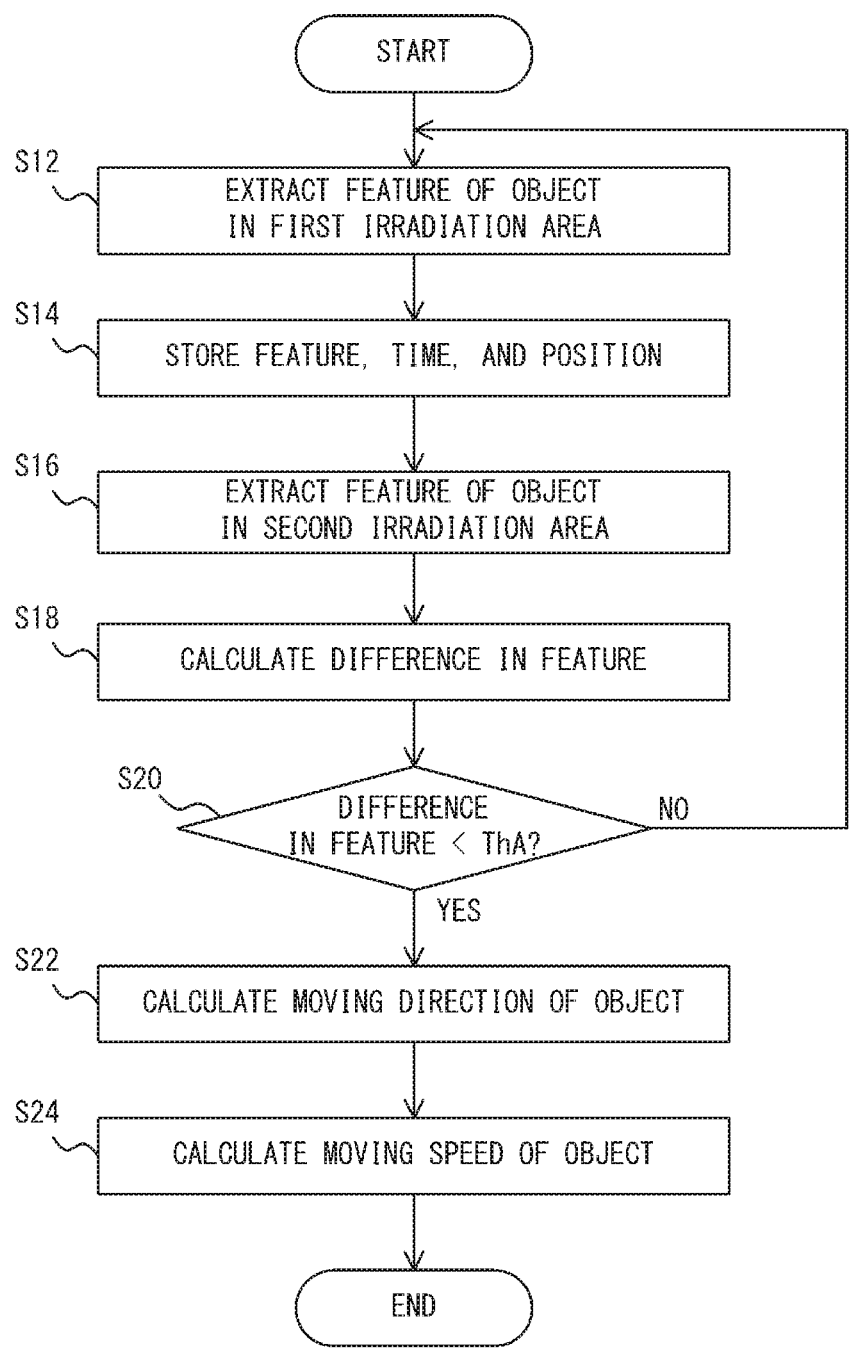
FIG. 4 is a flowchart showing an object detection method performed by an object detection device according to the first example embodiment.

FIG. 4 is a flowchart showing an object detection method performed by the object detection device 100 according to the first example embodiment. The first feature extraction unit 110 extracts feature data indicating a feature of the object 90 that has passed the first irradiation area 22 of the first sensor 20 (Step S12). The "feature data" corresponds to data related to the surface shape of the object 90 which is detected by the first sensor 20 in the first irradiation area 22. Further, the "feature data" relates to position information indicating the three-dimensional shape of the object 90 which is detected by the first sensor 20. A specific example of the "feature data" is described later. The first feature extraction unit 110 may generate the feature data from the position coordinates of each point group acquired by the first sensor 20.

Further, the first feature extraction unit 110 stores the extracted feature data in association with time when the feature data is extracted and a position where the object 90 has passed the first irradiation area 22 into the feature storage unit 112 (S14). Specifically, when "time t1" is associated with certain feature data, this feature data relates to the shape of the position of the object 90 that has been located in the first irradiation area 22 at time t1. Further, the "position where the object 90 has passed the first irradiation area 22" is a position that defines the shape of the object 90 in the first irradiation area 22. For example, the object detection device 100 (the first feature extraction unit 110 etc.) may detect a position of the object 90 in the first irradiation area 22 from a group of coordinate data in the first irradiation area 22 when the object 90 passes the first irradiation area 22. For example, the object detection device 100 (the first feature extraction unit 110 etc.) may calculate the center of mass (i.e., median point) of the coordinate data group of the object 90 in the first irradiation area 22.

Then, when the object 90 moves from the first irradiation area 22 to the second irradiation area 42, the second feature extraction unit 120 extracts feature data indicating a feature of the object 90 that has passed the second irradiation area 42 of the second sensor 40 (Step S16). The "feature data" corresponds to data related to the surface shape of the object 90 which is detected by the second sensor 40 in the second irradiation area 42. The other description of the feature data is the same as in the case of S12 and is therefore omitted.

The feature comparison unit 122 calculates a difference between the feature data extracted by the second feature extraction unit 120 and the feature data extracted by the first feature extraction unit 110 and stored in the feature storage unit 112 (Step S18). A specific example of a method of calculating a difference in feature is described later. Note that the feature comparison unit 122 may generate the feature data from the position coordinates of point groups respectively acquired by the first sensor 20 and the second sensor 40. Further, the first feature extraction unit 110 and the second feature extraction unit 120 may generate the feature data.

Then, the feature comparison unit 122 determines whether the feature data whose difference from the feature data extracted by the second feature extraction unit 120 falls below a predetermined threshold ThA exists among one or more feature data stored in the feature storage unit 112 (Step S20). Specifically, the feature comparison unit 122 determines whether a difference between the feature extracted by the first feature extraction unit 110 in the first irradiation area 22 and the feature extracted by the second feature extraction unit 120 in the second irradiation area 42 is less than the threshold ThA or not. The threshold ThA may be set to an appropriate value to determine that the features of the object 90 are substantially the same. When it is determined that the feature data whose difference from the feature data extracted by the second feature extraction unit 120 is less than the threshold ThA is not stored in the feature storage unit 112, i.e., a difference in feature data is equal to or more than the threshold ThA (NO in S20), the process returns to S12.

On the other hand, when it is determined that a difference in feature data is less than the threshold ThA (YES in S20), the feature comparison unit 122 determines that the same position on the same object 90 has passed the first irradiation area 22 and the second irradiation area 42. In this case, the direction calculation unit 130 calculates the moving direction of the object 90 between the first irradiation area 22 and the second irradiation area 42 based on the position where the object 90 has passed the first irradiation area 22 and the position where the object 90 has passed the second irradiation area 42 (Step S22). Further, the speed calculation unit 132 calculates the moving speed of the object 90 between the first irradiation area 22 and the second irradiation area 42 based on the time when and the position where the object 90 has passed the first irradiation area 22 and the time when and the position where the object 90 has passed the second irradiation area 42 (Step S24).

Thus, when the feature data whose difference from the feature data extracted by the second feature extraction unit 120 falls below the threshold ThA is stored in the feature storage unit 112, the feature comparison unit 122 determines that the object 90 having passed the first irradiation area 22 has passed the second irradiation area 42. In other words, the feature comparison unit 122 determines that a certain position on the object 90 having passed the first irradiation area 22 has passed the second irradiation area 42. In this case, the direction calculation unit 130 calculates the moving direction of the object 90, and the speed calculation unit 132 calculates the moving speed of the object 90.

Figure 5:
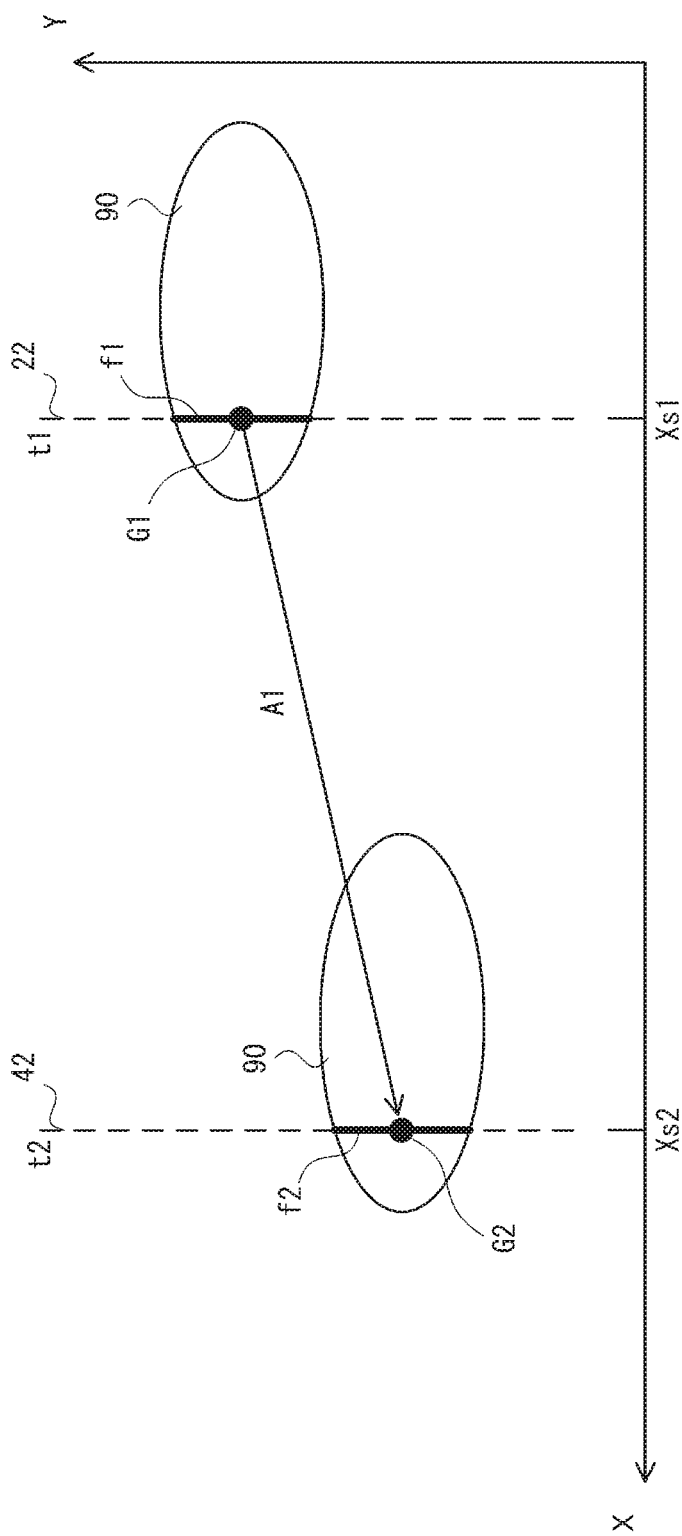
FIG. 5 is a view illustrating a method of calculating a moving direction and a moving speed according to the first example embodiment.

FIG. 5 is a view illustrating a method of calculating a moving direction and a moving speed according to the first example embodiment. The first sensor 20 scans laser light in the vertically upward direction (in the positive direction of the Z-axis) at the position of X=Xs1. Thus, the first irradiation area 22 is formed at the position of X=Xs1. Likewise, the second sensor 40 scans laser light in the vertically upward direction (in the positive direction of the Z-axis) at the position of X=Xs2. Thus, the second irradiation area 42 is formed at the position of X=Xs2. Although the distance between Xs1 and Xs2 is larger than the size of the object 90 in FIG. 5 to clarify the description, the distance between Xs1 and Xs2 may be significantly smaller than the size of the object 90 in practice. Thus, a change (rotation) of the posture of the object 90 between the first irradiation area 22 and the second irradiation area 42 is negligible.

Then, the object 90 passes the first irradiation area 22 at time t1, and a feature f1 (first feature) of the object 90 in the first irradiation area 22 is extracted. After that, the object 90 moves to the second irradiation area 42, and the object 90 passes the second irradiation area 42 at time t2. At this time, a feature f2 (second feature) of the object 90 in the second irradiation area 42 is extracted.

In this case, the feature comparison unit 122 determines that a difference between the feature f1 and the feature f2 is less than the threshold ThA (i.e., the feature f1 and the feature f2 are substantially the same). Then, the direction calculation unit 130 calculates coordinates (Xg1,Yg1,Zg1) of the center of mass G1 of a coordinate data group (point group) indicating the feature f1. Likewise, the direction calculation unit 130 calculates coordinates (Xg2,Yg2,Zg2) of the center of mass G2 of a coordinate data group (point group) indicating the feature f2. The direction calculation unit 130 then calculates the moving direction (indicated by the arrow A1) of the object 90 from a difference between the coordinates (Xg1,Yg1,Zg1) of the center of mass G1 and the coordinates (Xg2,Yg2,Zg2) of the center of mass G2.

Further, the speed calculation unit 132 calculates the distance D between the center of mass G1 and the center of mass G2. The speed calculation unit 132 then divides the distance D by a time difference (t2−t1) and thereby calculates a speed v of the object 90. Thus, the speed calculation unit 132 calculates v=D/(t2−t1).

As described above, the object detection device 100 according to the first example embodiment calculates the movement parameter of the object 90 when a difference in feature data is less than the threshold ThA, i.e., when the feature data in the first irradiation area 22 and the feature data in the second irradiation area 42 are substantially the same. The fact that a difference in feature is less than the threshold ThA (i.e. the feature f1 and the feature f2 are substantially the same) means that the object 90 that has passed the second irradiation area 42 is the same as the object 90 that has passed the first irradiation area 22. Therefore, by calculating the movement parameter (the moving direction and the moving speed) of the object 90 at this time, the movement parameter is accurately calculated without mixing up between objects. Since the object detection device 100 according to the first example embodiment calculates the movement parameter by using features of an object, it is capable of accurately calculating the movement parameter of the object 90.

In the case where the object 90 is a flight vehicle, the moving direction and the moving speed of the object 90 are not necessarily constant, and it is not easy to detect the moving direction and the moving speed of the object 90 by using one radar or the like. On the other hand, the object detection device 100 according to the first example embodiment calculates the moving direction and the moving speed by using the coordinate data extracted in two irradiation areas (the first irradiation area 22 and the second irradiation area 42) by the first sensor 20 and the second sensor 40, which are three-dimensional sensors. By using features of the object 90, it is easily determined that a reference position (e.g., the front of the object 90) for calculating the movement parameter in the object 90 has passed the first irradiation area 22 at time t1 and then passed the second irradiation area 42 at time t2. This allows easy determination as to whether the same position on the same object 90 has passed the first irradiation area 22 and the second irradiation area 42. Further, three-dimensional positions where the object 90 has passed in each of the first irradiation area 22 and the second irradiation area 42 can be easily calculated from the extracted coordinate data. Thus, the object detection device 100 according to the first example embodiment is capable of easily calculating the moving direction and the moving speed of the object 90.

Example of Feature Data and Difference

Specific examples of the feature data of the object 90 and its difference are described hereinafter. First to fourth examples are described below. In the following description, it is assumed that the object 90 is a flight vehicle.

Figure 6:
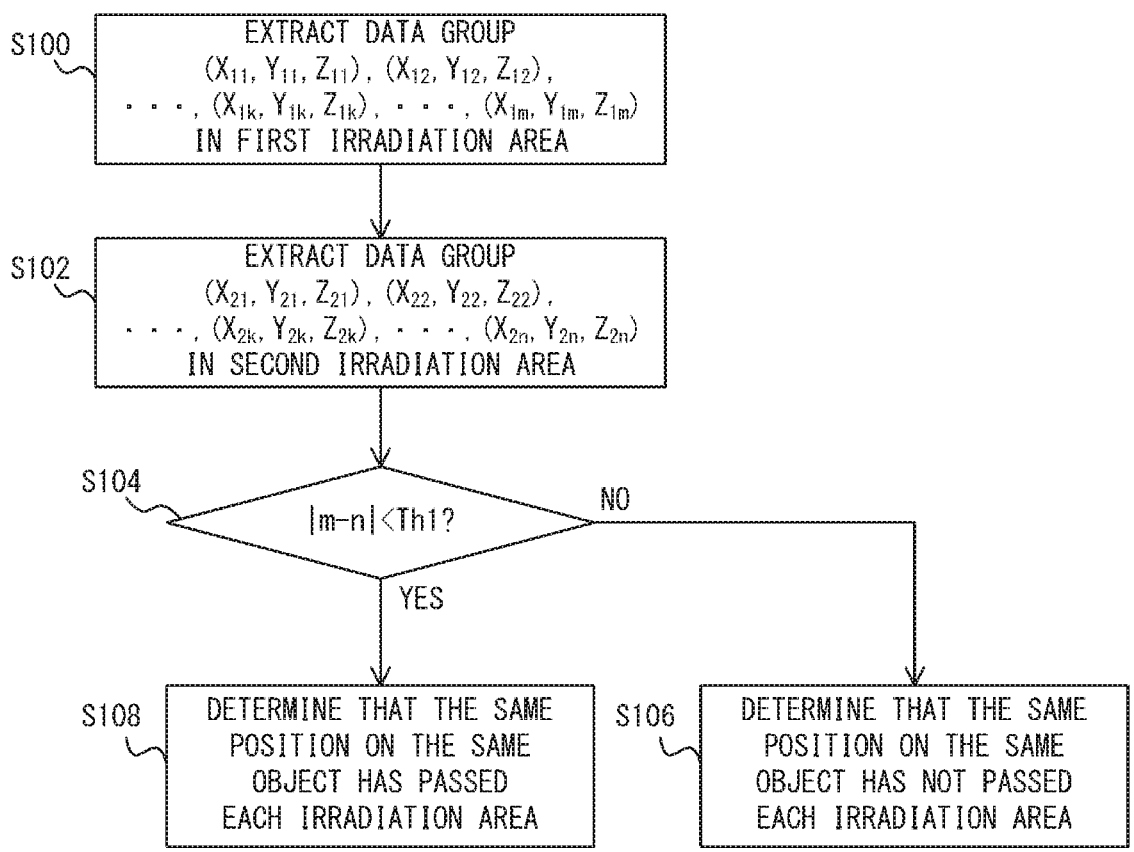
FIG. 6 is a flowchart showing a method of determining whether the same position on the same object has passed a first irradiation area and a second irradiation area in a first example.
Figure 7:
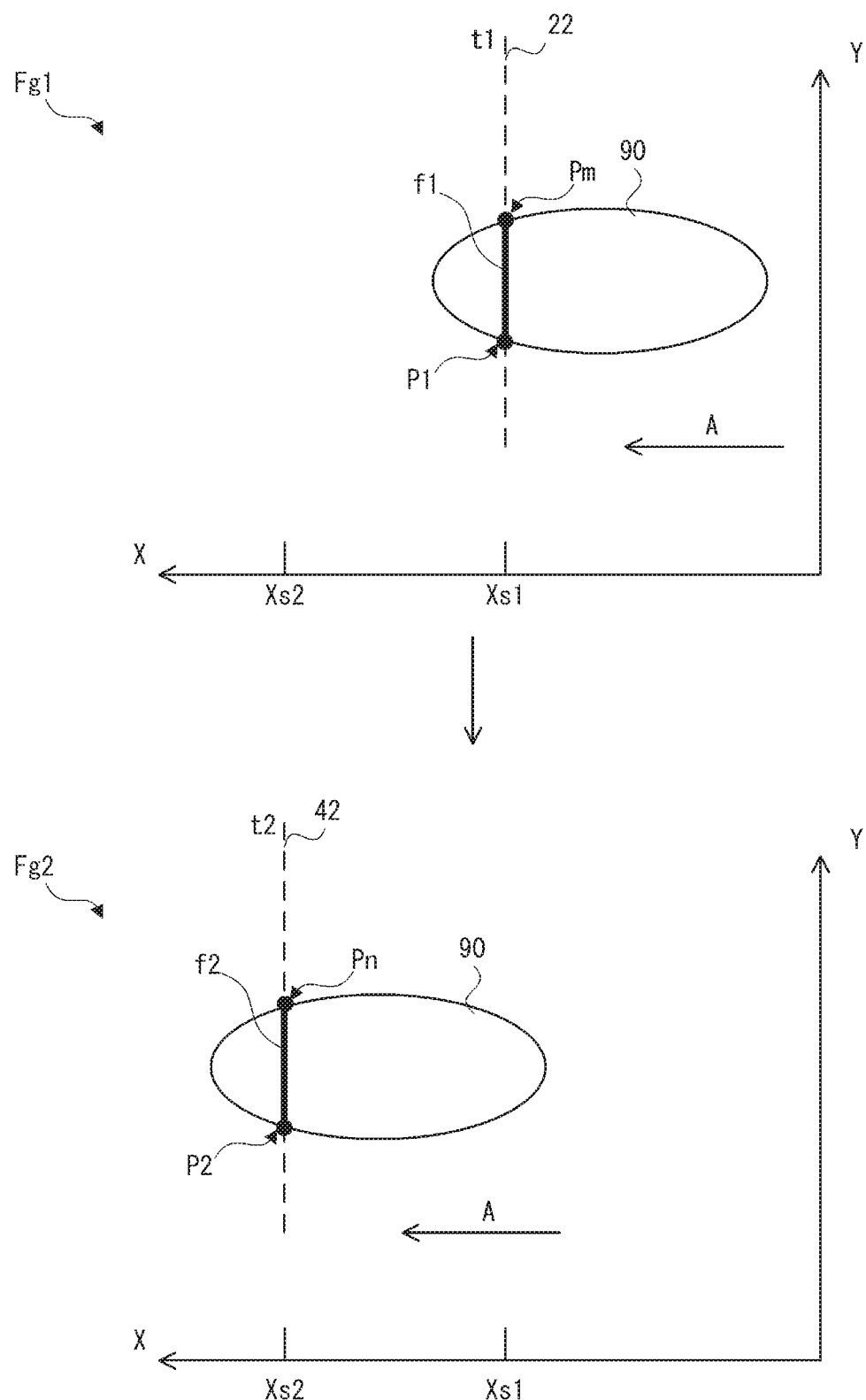
FIG. 7 is a view illustrating the first example.

FIG. 6 is a flowchart showing a method of determining whether the same position on the same object 90 has passed the first irradiation area 22 and the second irradiation area 42 in the first example. FIG. 7 is a view illustrating the first example. In the first example, the feature data corresponds to the number of data indicating each position on the object 90 in the first irradiation area 22 and the second irradiation area 42.

The first feature extraction unit 110 extracts a data group $(X_{11},Y_{11},Z_{11})$, $(X_{12},Y_{12},Z_{12})$, ..., $(X_{1k},Y_{1k},Z_{1k})$, ..., and $(X_{1m},Y_{1m},Z_{1m})$ in the first irradiation area 22 at time t1 (Step S100). Next, the second feature extraction unit 120 extracts a data group $(X_{21},Y_{21},Z_{21})$, $(X_{22},Y_{22},Z_{22})$, ..., $(X_{2k},Y_{2k},Z_{2k})$, ..., and $(X_{2n},Y_{2n},Z_{2n})$ in the second irradiation area 42 at time t2 (t2>t1) (Step S102). The first index in each coordinates corresponds to the irradiation area where the data is extracted. The second index k in each coordinates corresponds to the order of scanning of laser light when each data is acquired. Stated differently, the second index k in each coordinates corresponds to the order of acquisition of data (data number). Further, m indicates the number of data in the first irradiation area 22 acquired at time t1, and n indicates the number of data in the second irradiation area 42 acquired at time t2. Thus, the feature f1 in the first irradiation area 22 corresponds to the number m, and the feature f2 in the second irradiation area 42 corresponds to the number n.

As shown by the arrow Fg1 in FIG. 7, it is assumed that the first sensor 20 scans laser light in the positive direction of the Y-axis at the position of X=Xs1 at time t1. In this case, $(X_{11},Y_{11},Z_{11})$ corresponds to a position P1 where the value of the Y-coordinate is the smallest among the positions where the object 90 and the first irradiation area 22 intersect. Further, $(X_{1m},cY_{1m},Z_{1m})$ corresponds to a position Pm where the value of the Y-coordinate is the greatest among the positions where the object 90 and the first irradiation area 22 intersect.

As shown by the arrow Fg2 in FIG. 7, when the object 90 moves as indicated by the arrow A, the second sensor 40 scans laser light in the positive direction of the Y-axis at the position of X=Xs2 at time t2. In this case, $(X_{21},Y_{21},Z_{21})$ corresponds to a position P2 where the value of the Y coordinate is the smallest among the positions where the object 90 and the second irradiation area 42 intersect. Further, $(X_{2n},Y_{2n},Z_{2n})$ corresponds to a position Pn where the value of the Y coordinate is the greatest among the positions where the object 90 and the second irradiation area 42 intersect.

The feature comparison unit 122 determines whether a difference between the number of data acquired in the first irradiation area 22 and the number of data acquired in the second irradiation area 42 is less than a predetermined threshold Th1 or not (Step S104). Specifically, the feature comparison unit 122 determines whether |m−n|<Th1 is satisfied or not. Th1 corresponds to ThA shown in FIG. 4. When it is determined that |m−n|≥Th1 is satisfied, i.e., a difference between the number of data in the first irradiation area 22 and the number of data in the second irradiation area 42 is equal to or more than the threshold Th1 (NO in S104), the feature comparison unit 122 determines that the feature f1 and the feature f2 are not the same. Therefore, the feature comparison unit 122 determines that the same position on the same object 90 has not passed each irradiation area (Step S106). On the other hand, when it is determined that |m−n|<Th1 is satisfied, i.e., a difference between the number of data in the first irradiation area 22 and the number of data in the second irradiation area 42 is less than the threshold Th1 (YES in S104), the feature comparison unit 122 determines that the feature f1 and the feature f2 are the same. Therefore, the feature comparison unit 122 determines that the same position on the same object 90 has passed each irradiation area (Step S108). Thus, the direction calculation unit 130 and the speed calculation unit 132 calculate the movement parameter of the object 90 at this time.

The surface shape of the object 90 is irregular. Thus, a feature of the shape can vary by object 90 or at different positions on the same object 90. Accordingly, if the object 90 (or a position on the same object 90) that has passed each irradiation area is different, the number m of data acquired when the object 90 has passed the first irradiation area 22 and the number n of data acquired when the object 90 has passed the second irradiation area 42 can be different. In contrast, when the same position on the same object 90 has passed each irradiation area, the number m of data and the number n of data can be substantially the same. It is therefore possible to determine whether the same position on the same object 90 has passed the first irradiation area 22 and the second irradiation area 42 or not by using a difference between the number m of data obtained in the first irradiation area 22 and the number n of data obtained in the second irradiation area 42.

Further, in the first example, a difference between the number of data acquired in the first irradiation area 22 and the number of data acquired in the second irradiation area 42 is a difference in the feature of the object 90. Note that the number of data is easily and immediately determined. Thus, the method according to the first example enables easy and immediate calculation of a difference in the feature of the object 90.

Figure 8:
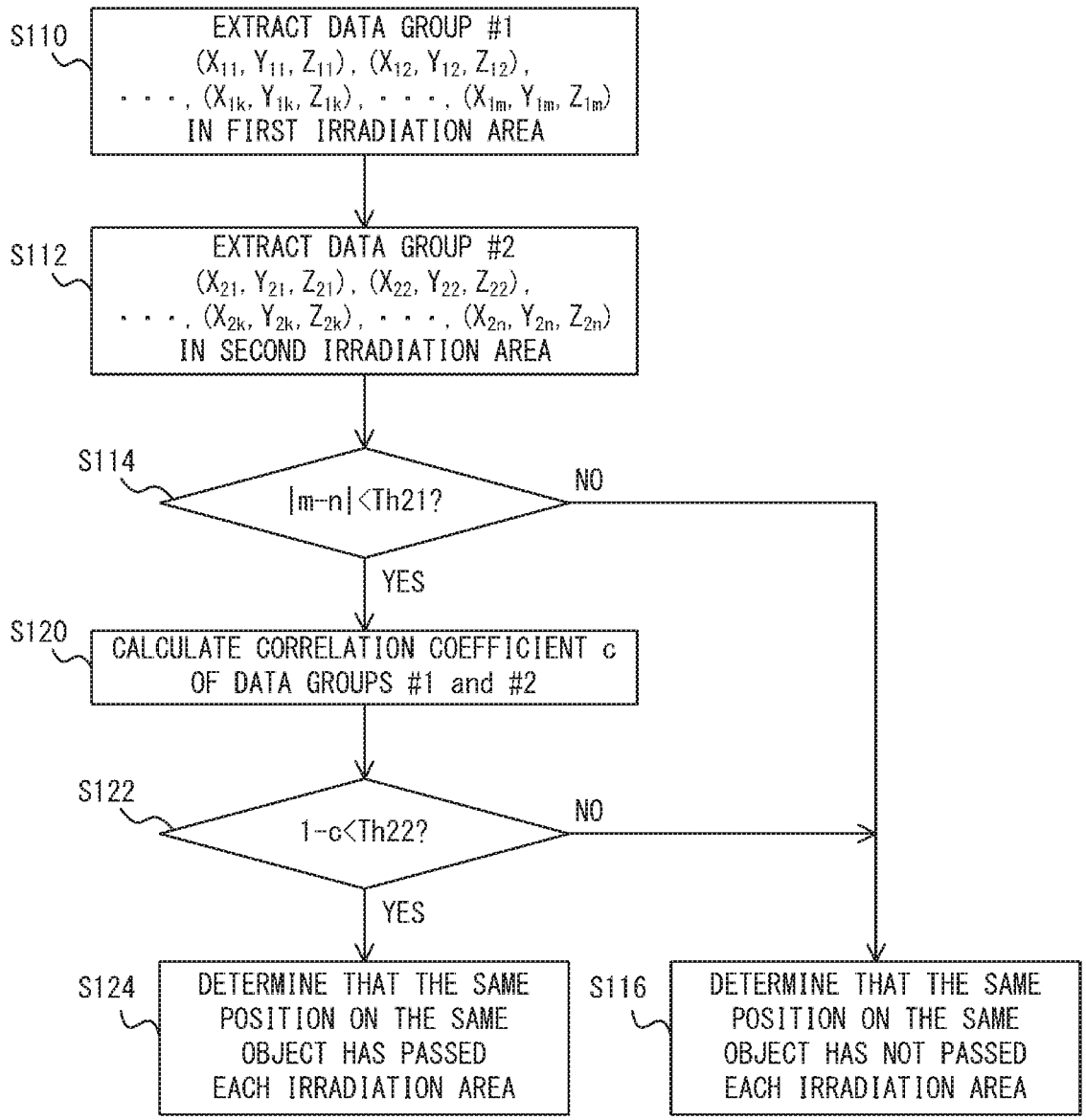
FIG. 8 is a flowchart showing a method of determining whether the same position on the same object has passed a first irradiation area and a second irradiation area in a second example.
Figure 9:
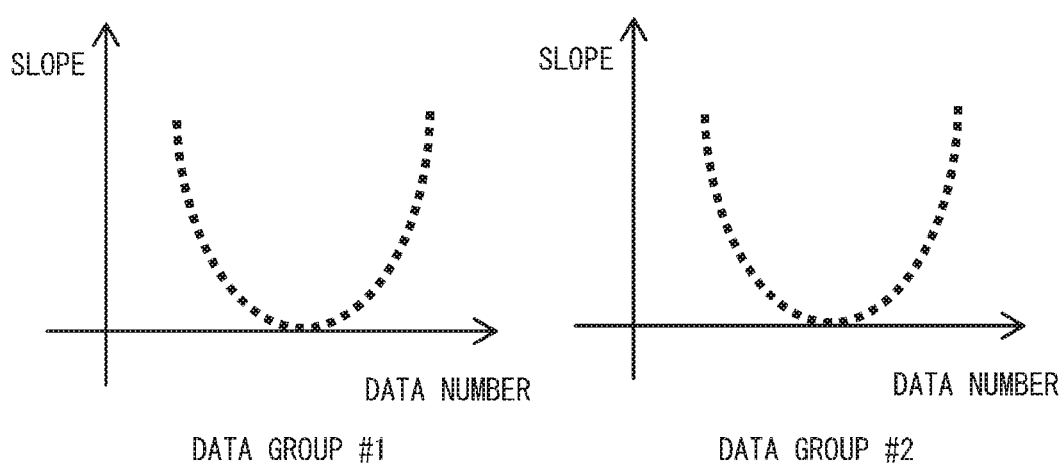
FIG. 9 is a view illustrating the second example.

FIG. 8 is a flowchart showing a method of determining whether the same position on the same object 90 has passed the first irradiation area 22 and the second irradiation area 42 in the second example. FIG. 9 is a view illustrating the second example. In the second example, the feature data corresponds to coordinate data indicating each position on the object 90 in the first irradiation area 22 and the second irradiation area 42. The first feature extraction unit 110 extracts a data group #1 $(X_{11},Y_{11},Z_{11})$, $(X_{12},Y_{12},Z_{12})$, ..., $(X_{1k},Y_{1k},Z_{1k})$, ..., and $(X_{1m},Y_{1m},Z_{1m})$ in the first irradiation area 22 at time t1 in the same manner as in the processing of S100 (Step S110). Next, the second feature extraction unit 120 extracts a data group #2 $(X_{21},Y_{21},Z_{21})$, $(X_{22},Y_{22},Z_{22})$, ..., $(X_{2k},Y_{2k},Z_{2k})$, ..., and $(X_{2n},Y_{2n},Z_{2n})$ in the second irradiation area 42 at time t2 in the same manner as in the processing of S102 (Step S112).

The feature comparison unit 122 determines whether a difference between the number of data acquired in the first irradiation area 22 and the number of data acquired in the second irradiation area 42 is less than a predetermined threshold Th21 or not in the same manner as in the processing of S104 (Step S114). Th21 corresponds to Th1 shown in FIG. 6. When it is determined that a difference between the number of data in the first irradiation area 22 and the number of data in the second irradiation area 42 is equal to or more than the threshold Th21 (NO in S114), the feature comparison unit 122 determines that the same position on the same object 90 has not passed each irradiation area (Step S116).

On the other hand, when it is determined that a difference between the number of data in the first irradiation area 22 and the number of data in the second irradiation area 42 is less than the threshold Th21 (YES in S114), the feature comparison unit 122 calculates a correlation coefficient c between the data group #1 and the data group #2 (Step S120). For example, the feature comparison unit 122 calculates the variation between adjacent coordinate data in the data group #1. Likewise, the feature comparison unit 122 calculates the variation between adjacent coordinate data in the data group #2.

The "variation" is the slope, distance or the like between coordinate data, for example. For example, for the data group #1, the feature comparison unit 122 calculates the slope between $(X_{11},Y_{11},Z_{11})$ and $(X_{12},Y_{12},Z_{12})$. Further, the feature comparison unit 122 calculates the slope between $(X_{1k},Y_{1k},Z_{1k})$ and $(X_{1(k+1)},Y_{1(k+1)},Z_{1(k+1)})$. Then, the feature comparison unit 122 calculates the slope between $(X_{1(m-1)},Y_{1(m-1)},Z_{1(m-1)})$ and $(X_{1m},Y_{1m},Z_{1m})$. Likewise, for the data group #2, the feature comparison unit 122 calculates the slope between adjacent coordinate data. FIG. 9 is a graph showing the relationship between the data number (the second index k of coordinate data) and the slope for each of the data group #1 and the data group #2. The feature comparison unit 122 calculates the correlation coefficient c between those two graphs.

The feature comparison unit 122 determines whether a value $\Delta 2 = 1-c$ indicating a difference between the data group #1 and the data group #2 is less than a predetermined threshold Th22 or not (Step S122). Specifically, the feature comparison unit 122 determines whether 1−c<Th22 is satisfied or not. Th22 (0<Th22<1) corresponds to ThA shown in FIG. 4. When it is determined that 1−c≥Th22 is satisfied, i.e., 1−c is equal to or more than the threshold Th22 (NO in S122), the feature comparison unit 122 determines that the feature f1 and the feature f2 are not the same. Thus, the feature comparison unit 122 determines that the same position on the same object 90 has not passed each irradiation area (Step S116). On the other hand, when it is determined that 1−c<Th22 is satisfied, i.e., 1−c is less than the threshold Th22 (YES in S122), the feature comparison unit 122 determines that the feature f1 and the feature f2 are the same. Thus, the feature comparison unit 122 determines that the same position on the same object 90 has passed each irradiation area (Step S124). Thus, the direction calculation unit 130 and the speed calculation unit 132 calculate the movement parameter of the object 90 at this time.

The surface shape of the object 90 is irregular. Thus, a feature of the shape can vary by object 90 or at different positions on the same object 90. Accordingly, if the object 90 (or a position on the same object 90) that has passed each irradiation area is different, the correlation between the data group #1 acquired when the object 90 has passed the first irradiation area 22 and the data group #2 acquired when the object 90 has passed the second irradiation area 42 is low. In contrast, when the same position on the same object 90 has passed each irradiation area, the correlation between the data group #1 and the data group #2 can be high. It is therefore possible to determine whether the same position on the same object 90 has passed the first irradiation area 22 and the second irradiation area 42 or not by using $\Delta 2 = 1-c$ indicating a difference between the data group #1 obtained in the first irradiation area 22 and the data group #2 obtained in the second irradiation area 42.

In the second example, a difference (1−c) between the data group #1 acquired in the first irradiation area 22 and the data group #2 acquired in the second irradiation area 42 is a difference in the feature of the object 90. It is relatively easy to extract the data group #1 and the data group #2 respectively in the first irradiation area 22 and the second irradiation area 42 and calculate the correlation coefficient between them. Thus, the method according to the second example enables easy calculation of a difference in the feature of the object 90.

Although the feature comparison unit 122 calculates the variation (the slope etc.) between adjacent coordinate data in each of the data group #1 and the data group #2 and calculates the correlation coefficient between the graphs of the variation, the present invention is not limited to this structure. A method of calculating the correlation coefficient between the data group #1 and the data group #2 is arbitrary. For example, the feature comparison unit 122 may calculate the correlation coefficient between a curved line formed by the data group #1 and a curved line formed by the data group #2. Further, the feature comparison unit 122 may calculate a difference between coordinate elements with the same second index k in a data group #1' and the data group #2, where the data group #1' is obtained by projection (coordinate transformation) of the data group #1 on the plane of $X=Xs2$ in such a way that the center of mass of the data group #1 and the center of mass of the data group #2 coincide with each other. Then, the feature comparison unit 122 may calculate the sum of the square values of differences of each element (coordinate data) as a difference in the feature data, and determine whether this difference is less than the predetermined threshold ThA or not. Note that, in this case, the feature comparison unit 122 may perform coordinate transformation in such a way that the first data in the data group #1 and the first data in the data group #2 coincide with each other.

Figure 10:
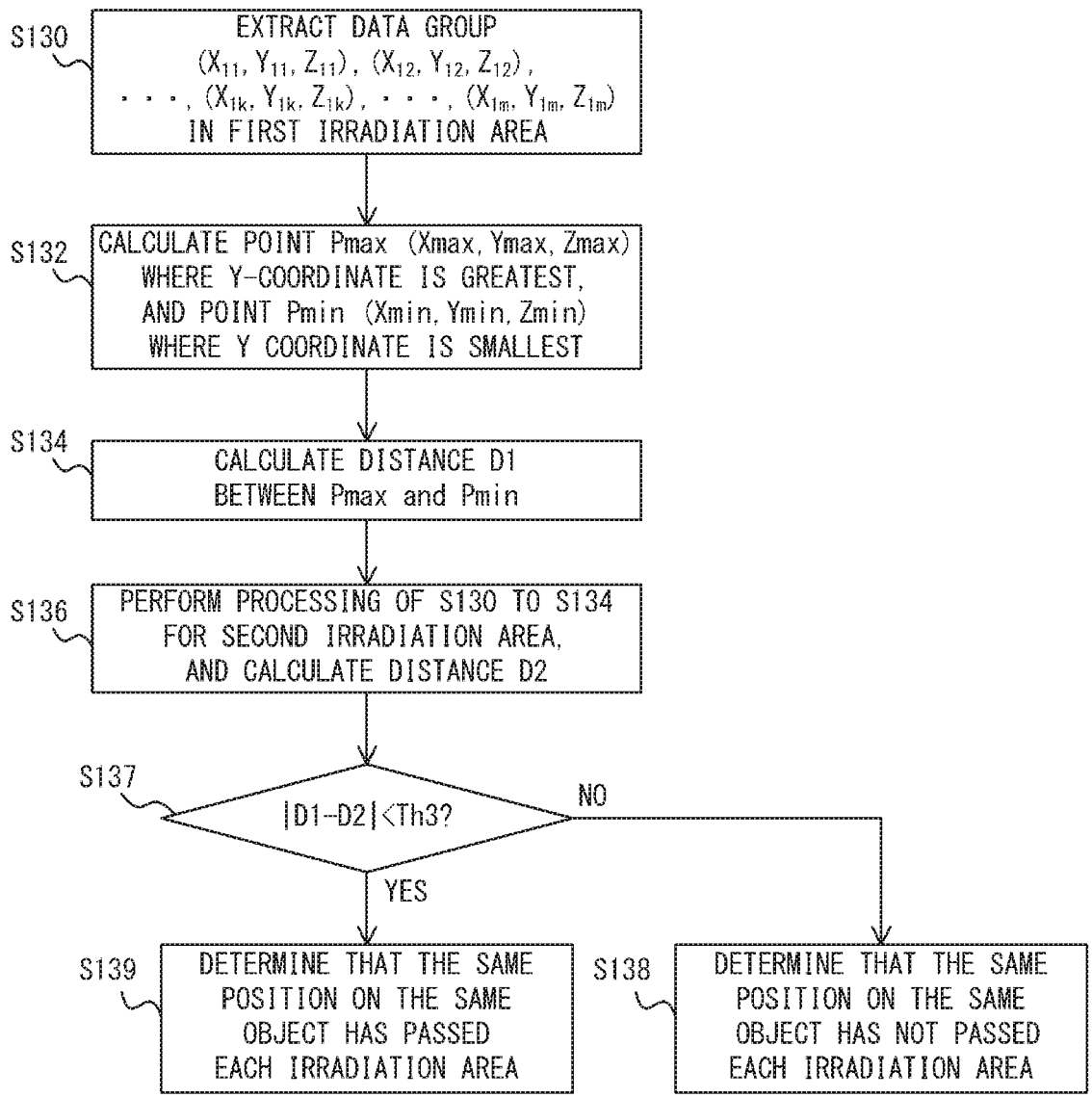
FIG. 10 is a flowchart showing a method of determining whether the same position on the same object has passed a first irradiation area and a second irradiation area in a third example.
Figure 11:
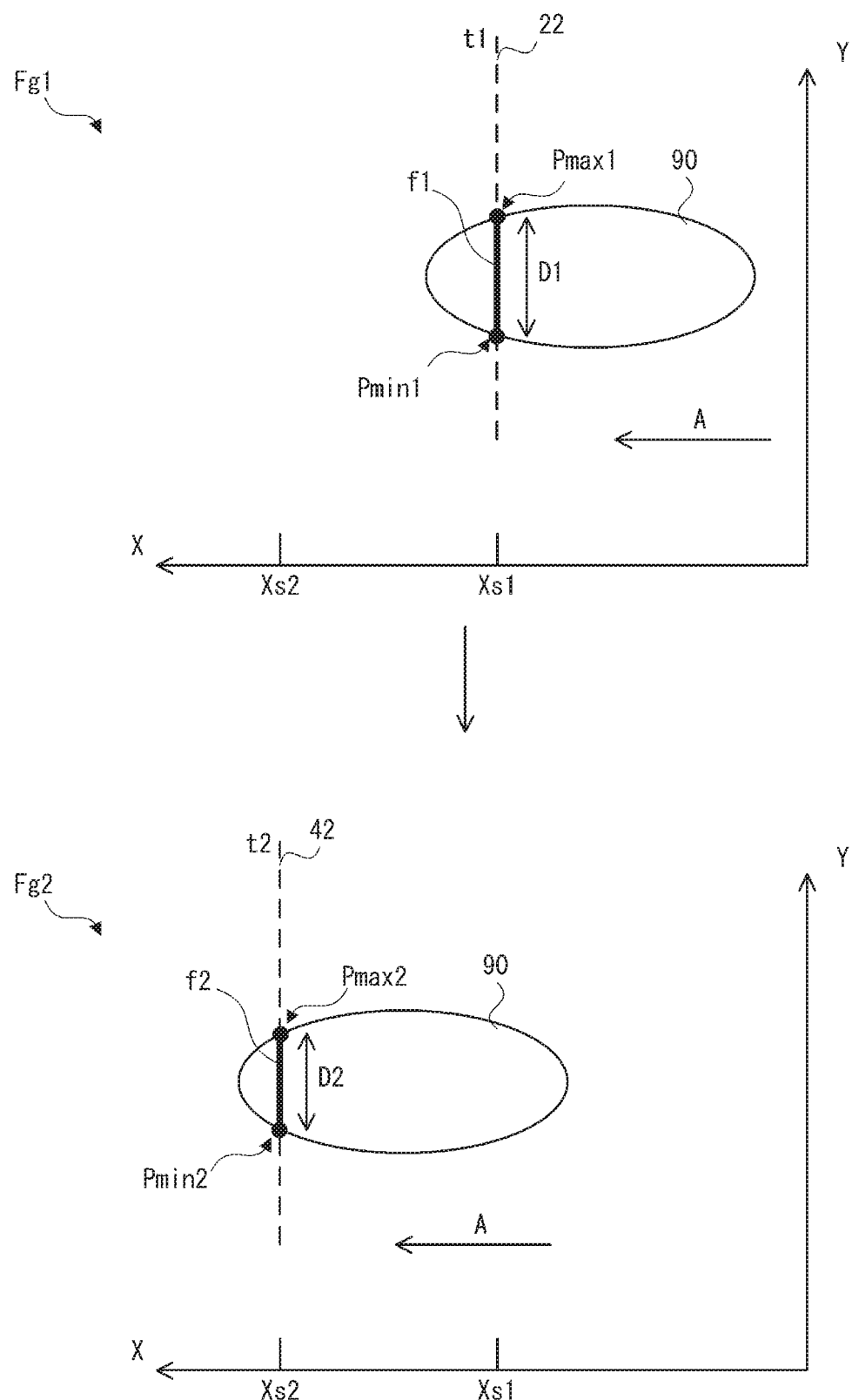
FIG. 11 is a view illustrating the third example.

FIG. 10 is a flowchart showing a method of determining whether the same position on the same object 90 has passed the first irradiation area 22 and the second irradiation area 42 in the third example. FIG. 11 is a view illustrating the third example. In the third example, the feature data corresponds to the size of the object 90 in the first irradiation area 22 and the second irradiation area 42. The first feature extraction unit 110 extracts a data group $(X_{11}, Y_{11}, Z_{11})$, $(X_{12}, Y_{12}, Z_{12})$, ..., $(X_{1k}, Y_{1k}, Z_{1k})$, ..., and $(X_{1m}, Y_{1m}, Z_{1m})$ in the first irradiation area 22 at time t1 in the same manner as in the processing of S100 (Step S130).

The feature comparison unit 122 calculates a coordinate Pmax (Xmax,Ymax,Zmax) of a point where the Y-coordinate is the greatest, and a coordinate Pmin (Xmin,Ymin,Zmin) of a point where the Y coordinate is the smallest among the extracted data (Step S132). As shown by the arrow Fg1 in FIG. 11, the first sensor 20 scans laser light in the positive direction of the Y-axis at the position of $X=Xs1$ at time t1. In this case, $(X_{11}, Y_{11}, Z_{11})$ corresponds to a position Pmim1 where the value of the Y-coordinate is the smallest among the positions where the object 90 and the first irradiation area 22 intersect. Further, $(X_{1m}, Y_{1m}, Z_{1m})$ corresponds to a position Pmax1 where the value of the Y-coordinate is the greatest among the positions where the object 90 and the first irradiation area 22 intersect.

The feature comparison unit 122 calculates a distance D1 between Pmax and Pmin (Step S134). To be specific, the feature comparison unit 122 calculates the distance D1 by calculating $D1=\sqrt{(Xmax-Xmin)^2+(Ymax-Ymin)^2+(Zmax-Zmin)^2}$. This distance D1 corresponds to the size of the object 90 in the first irradiation area 22.

Then, the same processing as in S130 to S134 is performed for the second irradiation area 42, and the distance D2 is calculated (Step S136). To be specific, the second feature extraction unit 120 extracts a data group $(X_{21}, Y_{21}, Z_{21})$, $(X_{22}, Y_{22}, Z_{22})$, ..., $(X_{2k}, Y_{2k}, Z_{2k})$, ..., and $(X_{2n}, Y_{2n}, Z_{2n})$ in the second irradiation area 42 at time t2. The feature comparison unit 122 calculates a coordinate Pmax (Xmax,Ymax,Zmax) of a point where the Y-coordinate is the greatest, and a coordinate Pmin (Xmin,Ymin,Zmin) of a point where the Y coordinate is the smallest among the extracted data.

As shown by the arrow Fg2 in FIG. 11, when the object 90 moves as indicated by the arrow A, the second sensor 40 scans laser light in the positive direction of the Y-axis at the position of $X=Xs2$ at time t2. In this case, $(X_{21}, Y_{21}, Z_{21})$ corresponds to a position Pmim2 where the value of the Y-coordinate is the smallest among the positions where the object 90 and the second irradiation area 42 intersect. Further, $(X_{2n}, Y_{2n}, Z_{2n})$ corresponds to a position Pmax2 where the value of the Y-coordinate is the greatest among the positions where the object 90 and the second irradiation area 42 intersect. Further, the feature comparison unit 122 calculates the distance D2 between Pmax and Pmin in the same manner as in the case of the first irradiation area 22.

After that, the feature comparison unit 122 determines whether a difference between the distance D1 in the first irradiation area 22 and the distance D2 in the second irradiation area 42 is less than a predetermined threshold Th3 or not (Step S137). Specifically, the feature comparison unit 122 determines whether $|D1-D2|<Th3$ is satisfied or not. Th3 corresponds to ThA shown in FIG. 4. When it is determined that $|D1-D2|\geq Th3$ is satisfied (NO in S137), the feature comparison unit 122 determines that the feature f1 and the feature f2 are not the same. Thus, the feature comparison unit 122 determines that the same position on the same object 90 has not passed each irradiation area (Step S138). On the other hand, when it is determined that $|D1-D2|<Th3$ is satisfied (YES in S137), the feature comparison unit 122 determines that the feature f1 and the feature f2 are the same. Thus, the feature comparison unit 122 determines that the same position on the same object 90 has passed each irradiation area (Step S139). Thus, the direction calculation unit 130 and the speed calculation unit 132 calculate the movement parameter of the object 90 at this time.

The surface shape of the object 90 is irregular, and its width is not uniform. Thus, the size (width) of the object 90 can vary by object 90 or at different positions on the same object 90. Accordingly, if the object 90 (or a position on the same object 90) that has passed each irradiation area is different, the size (distance D1) of the object 90 in the first irradiation area 22 and the size (distance D2) of the object 90 in the second irradiation area 42 can be different. In contrast, when the same position on the same object 90 has passed each irradiation area, the distance D1 and the distance D2 can be substantially the same. It is therefore possible to determine whether the same position on the same object 90 has passed the first irradiation area 22 and the second irradiation area 42 or not by using a difference between the size in the first irradiation area 22 and the size in the second irradiation area 42. Note that the distance may be normalized when calculating a difference in distance.

In the third example, a difference between the size of the object 90 in the first irradiation area 22 and the size of the object 90 in the second irradiation area 42 is a difference in the feature of the object 90. It is relatively easy to acquire the coordinate data in each of the first irradiation area 22 and the second irradiation area 42, calculate the sizes of the object 90, and calculate a difference in the size of the object 90 in each of the first irradiation area 22 and the second irradiation area 42. Thus, the method according to the third example enables easy calculation of a difference in the feature of the object 90.

Figure 12:
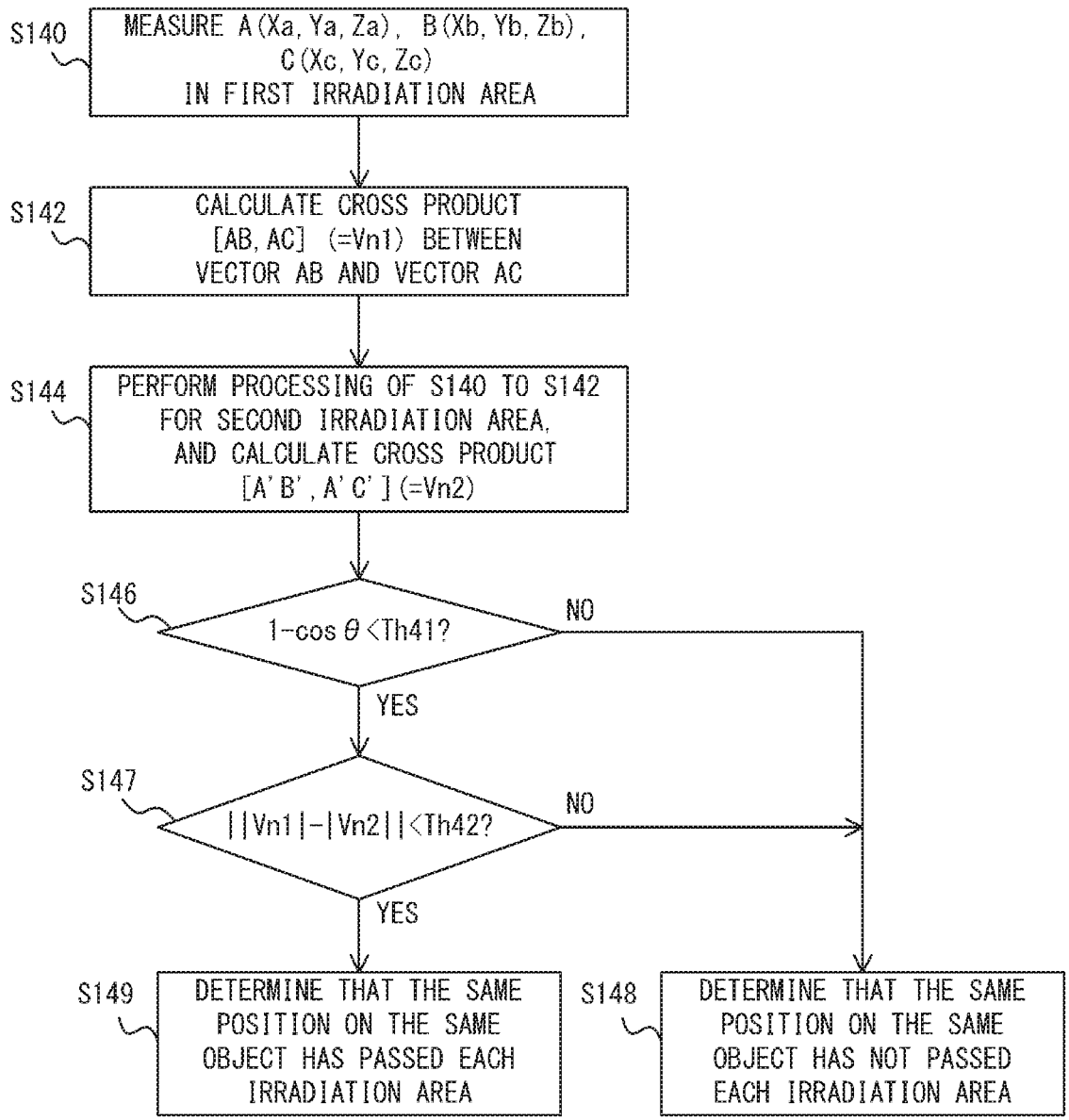
FIG. 12 is a flowchart showing a method of determining whether the same position on the same object has passed a first irradiation area and a second irradiation area in a fourth example.
Figure 13:
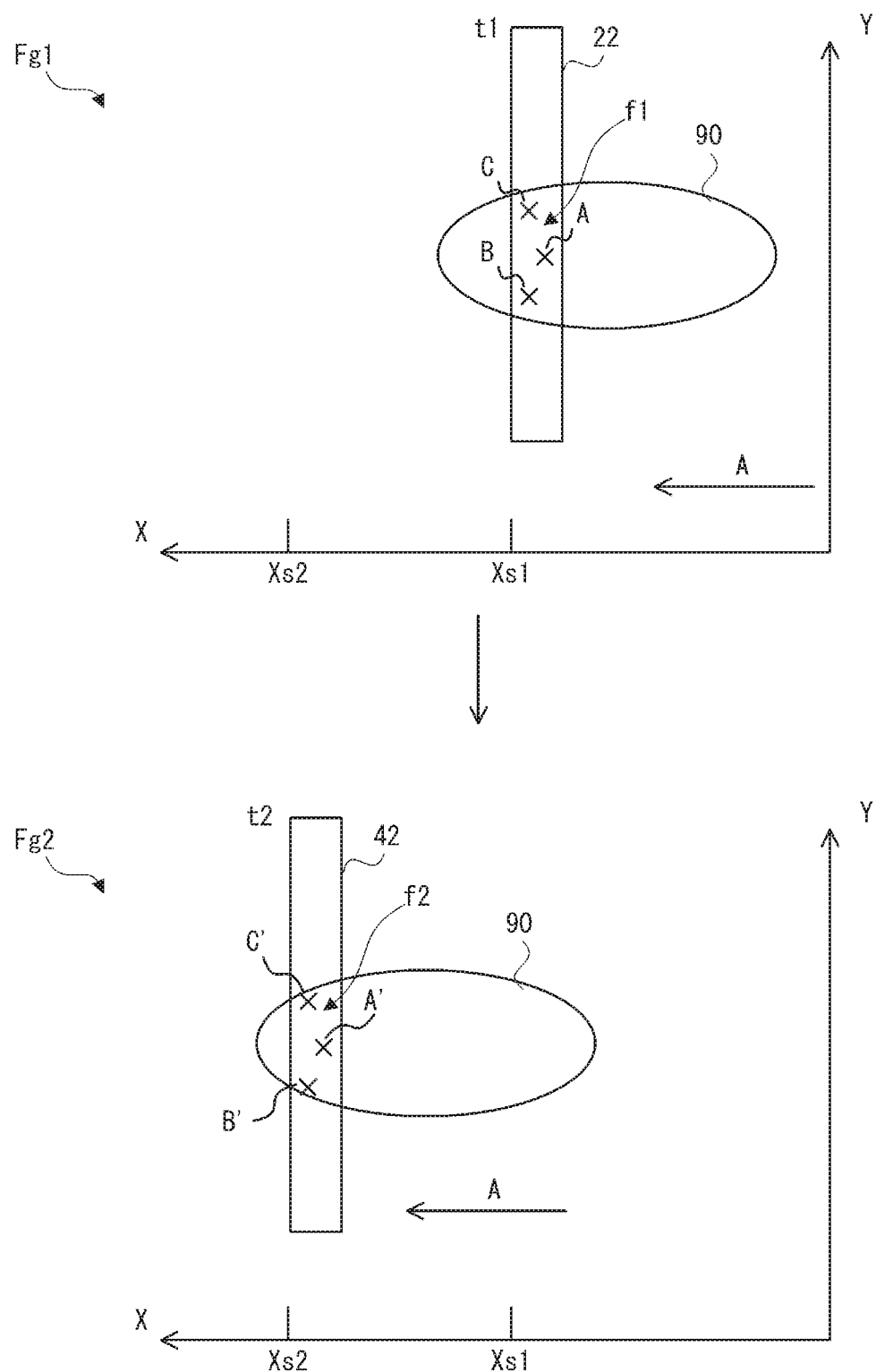
FIG. 13 is a view illustrating the fourth example.

FIG. 12 is a flowchart showing a method of determining whether the same position on the same object 90 has passed the first irradiation area 22 and the second irradiation area 42 in the fourth example. FIG. 13 is a view illustrating the fourth example. In the fourth example, the feature data corresponds to the normal vector of the object 90 in the first irradiation area 22 and the second irradiation area 42. Note that, in the fourth example, the first irradiation area 22 and the second irradiation area 42 are not planar, and they have a width in the X-axis direction.

The first feature extraction unit 110 extracts data at three measurement points A(Xa,Ya,Za), B(Xb,Yb,Zb), and C(Xc,Yc,Zc) in the first irradiation area 22 as shown by the arrow Fg1 in FIG. 13 (Step S140). The measurement points A. B and C may be points whose intervals (angular difference) in the irradiation direction of laser light are constant. Further, A may be a point near the center of the object 90 in the first irradiation area 22.

Next, the feature comparison unit 122 calculates the cross product [AB,AC] (cross product vector) between the vector AB and the vector AC (Step S142). The cross product [AB,AC] corresponds to the normal vector Vn1 of the object 90 in the first irradiation area 22 at time t1. When the X, Y, Z components of the cross product [AB,AC] are (a,b,c), the cross product [AB,AC] is calculated geometrically as below.

$$a=(Yb-Ya)*(Zc-Za)-(Yc-Ya)*(Zb-Za)$$

$$b=(Zb-Za)*(Xc-Xa)-(Zc-Za)*(Xb-Xa)$$

$$c=(Xb-Xa)*(Yc-Ya)-(Xc-Xa)*(Yb-Ya)$$

Then, the feature comparison unit 122 performs the processing of S140 to S142 for the second irradiation area 42, and calculates the cross product [A'B',A'C'] (cross product vector) (Step S144). Specifically, the second feature extraction unit 120 extracts data at three measurement points A'(Xa',Ya',Za'), B'(Xb',Yb',Zb'), and C'(Xc',Yc',Zc') in the second irradiation area 42 as shown by the arrow Fg2 in FIG. 13. The feature comparison unit 122 then calculates the cross product [A'B',A'C'] between the vector A'B' and the vector A'C'. The cross product [A'B',A'C'] corresponds to the normal vector Vn2 of the object 90 in the second irradiation area 42 at time t2. The measurement points A', B' and C' may be points whose intervals (angular difference) in the irradiation direction of laser light are constant. Thus, the X-coordinate can be constant for each of the measurement points A', B' and C'. Further, A' may be a point near the center of the object 90 in the second irradiation area 42. The intervals of the measurement points A', B' and C' in the irradiation direction may be the same as the intervals of the measurement points A, B and C in the irradiation direction in the first irradiation area 22.

The feature comparison unit 122 calculates an angle θ between the normal vector Vn1 (i.e., the cross product vector [AB,AC]) and the normal vector Vn2 (i.e., the cross product vector [A'B',A'C']), and determines whether 1−cos θ<Th41 is satisfied or not (Step S146). Note that Th41 is a predetermined threshold, which corresponds to ThA shown in FIG. 4. Further, cos θ can be calculated by the inner product between the normal vector Vn1 and the normal vector Vn2. When 1−cos θ≥Th41 is satisfied (NO in S146), a difference in direction between the normal vector Vn1 and the normal vector Vn2 is large, and the feature comparison unit 122 determines that the feature f1 and the feature f2 are not the same. Thus, the feature comparison unit 122 determines that the same position on the same object 90 has not passed each irradiation area (Step S148).

On the other hand, when 1−cos θ<Th41 is satisfied (YES in S146), a difference in direction between the normal vector Vn1 and the normal vector Vn2 is small. In this case, the feature comparison unit 122 determines whether a difference between the size |Vn1| of the normal vector Vn1 and the size |Vn2| of the normal vector Vn2 is less than a predetermined threshold Th42 or not (Step S147). Specifically, the feature comparison unit 122 determines whether ||Vn1|−|Vn2||<Th42 is satisfied or not. Th42 corresponds to ThA shown in FIG. 4.

When it is determined that ||Vn1|−|Vn2||≥Th42 is satisfied (NO in S147), the feature comparison unit 122 determines that the feature f1 and the feature f2 are not the same. Thus, the feature comparison unit 122 determines that the same position on the same object 90 has not passed each irradiation area (Step S148). Therefore, the feature comparison unit 122 determines that the same position on the same object 90 has not passed each irradiation area when a difference between the size |Vn1| of the normal vector in the first irradiation area 22 and the size |Vn2| of the normal vector in the second irradiation area 42 is equal to or more than the threshold Th42. On the other hand, when it is determined that ||Vn1|−|Vn2||<Th42 is satisfied (YES in S147), the feature comparison unit 122 determines that the feature f1 and the feature f2 are the same. Thus, the feature comparison unit 122 determines that the same position on the same object 90 has passed each irradiation area (Step S149). Therefore, the feature comparison unit 122 determines that the same position on the same object 90 has passed each irradiation area when a difference between the size |Vn1| of the normal vector in the first irradiation area 22 and the size |Vn2| of the normal vector in the second irradiation area 42 is less than the threshold Th42. Thus, the direction calculation unit 130 and the speed calculation unit 132 calculate the movement parameter of the object 90 at this time.

The surface shape of the object 90 is irregular, and the orientation of the surface is also not uniform when the surface shape has a streamlined shape or the like. Thus, the normal vector can vary by object 90 or at different positions on the same object 90. Accordingly, if the object 90 (or a position on the same object 90) that has passed each irradiation area is different, the normal vector Vn1 of the object 90 in the first irradiation area 22 and the normal vector Vn2 of the object 90 in the second irradiation area 42 can be different. In contrast, when the same position on the same object 90 has passed each irradiation area, the normal vector Vn1 and the normal vector Vn2 can be substantially the same. It is therefore possible to determine whether the same position on the same object 90 has passed the first irradiation area 22 and the second irradiation area 42 or not by using a difference between the normal vectors (a difference in each of the direction and the size of the normal vectors) in the first irradiation area 22 and the second irradiation area 42. Note that the size of the normal vector may be normalized when calculating a difference in the size of the normal vectors (S147).

In the fourth example, a difference between the normal vector of the object 90 in the first irradiation area 22 and the normal vector of the object 90 in the second irradiation area 42 is a difference in the feature of the object 90. Since the normal vector is uniquely defined if a plane is determined, it appropriately represents the surface shape of the object 90.

Thus, the method according to the fourth example enables more appropriate calculation of a difference in the feature of the object 90.

Modified Example

It should be noted that the present invention is not restricted to the above-described example embodiments, and various changes and modifications may be made without departing from the scope of the invention. For example, the order of process steps in the flowcharts shown in FIG. 4 and so on may be altered as appropriate. Further, one or more process steps in the flowcharts shown in FIG. 4 and so on may be omitted. For example, one of S22 and S24 in FIG. 4 may be omitted. Further, although the object 90 passes the first irradiation area 22 and then passes the second irradiation area 42 in the above-described example embodiments, the present invention is not limited to this structure. The object 90 may pass the second irradiation area 42 and then pass the first irradiation area 22. In this case, the feature storage unit 112 may store the feature data extracted by the second feature extraction unit 120. The feature comparison unit 122 may then compare the feature data extracted by the first feature extraction unit 110 with the feature data stored in the feature storage unit 112.

Further, although the object detection device 100 according to the first example embodiment includes the first feature extraction unit 110 and the second feature extraction unit 120 in the above description, the present invention is not limited to this structure. The first feature extraction unit 110 and the second feature extraction unit 120 may be implemented by one element. Specifically, one feature extraction unit may extract a feature of the object 90 in the first irradiation area 22 and a feature of the object 90 in the second irradiation area 42.

Further, although the first sensor 20 and the second sensor 40 are three-dimensional sensors in the above-described example embodiments, the present invention is not limited to this structure. The first sensor 20 and the second sensor 40 may be two-dimensional sensors. However, if the first sensor 20 and the second sensor 40 are two-dimensional sensors, it is necessary to perform complicated image processing such as image recognition in order to detect the shape of the object 90. Further, use of a three-dimensional sensor enables accurate detection of the three-dimensional shape of the object 90 compared with use of a two-dimensional sensor. Thus, use of a three-dimensional sensor enables easy and accurate detection of the shape of the object 90. Furthermore, use of a three-dimensional sensor enables accurate detection of a position where the object 90 has passed the irradiation area compared with use of a two-dimensional sensor. Thus, use of a three-dimensional sensor enables accurate calculation of the movement parameter of the object 90.

Further, although the object detection system 10 includes two sensors in the above-described example embodiments, the present invention is not limited to this structure. The number of sensors may be three. Then, the acceleration of the object 90 may be calculated by using the position and time where object 90 passes three irradiation areas formed by the three sensors. For example, a third irradiation area may be provided between the first irradiation area 22 and the second irradiation area 42, and the acceleration can be calculated from a difference between the speed between the first irradiation area 22 and the third irradiation area and the speed between the third irradiation area and the second irradiation area 42. Thus, the object detection device 100 may calculate the acceleration of the object 90 as the movement parameter.

Further, although the first sensor 20 forms the first irradiation area 22 and the second sensor 40 forms the second irradiation area 42 in the above-described example embodiments, the present invention is not limited to this structure. One sensor may form both of the first irradiation area 22 and the second irradiation area 42. In this case, the first irradiation area 22 and the second irradiation area 42 may be formed by using a scan mirror such as a polygon mirror for laser light from a sensor. Further, one sensor may form three or more irradiation areas.

Further, in the above-described first example embodiment, rotation of the object 90 between the first irradiation area 22 and the second irradiation area 42 is not taken into consideration. However, the feature comparison unit 122 may compare coordinate data groups extracted respectively in the first irradiation area 22 and the second irradiation area 42 in consideration of the case where the object 90 rotates between the first irradiation area 22 and the second irradiation area 42.

Figure 14:
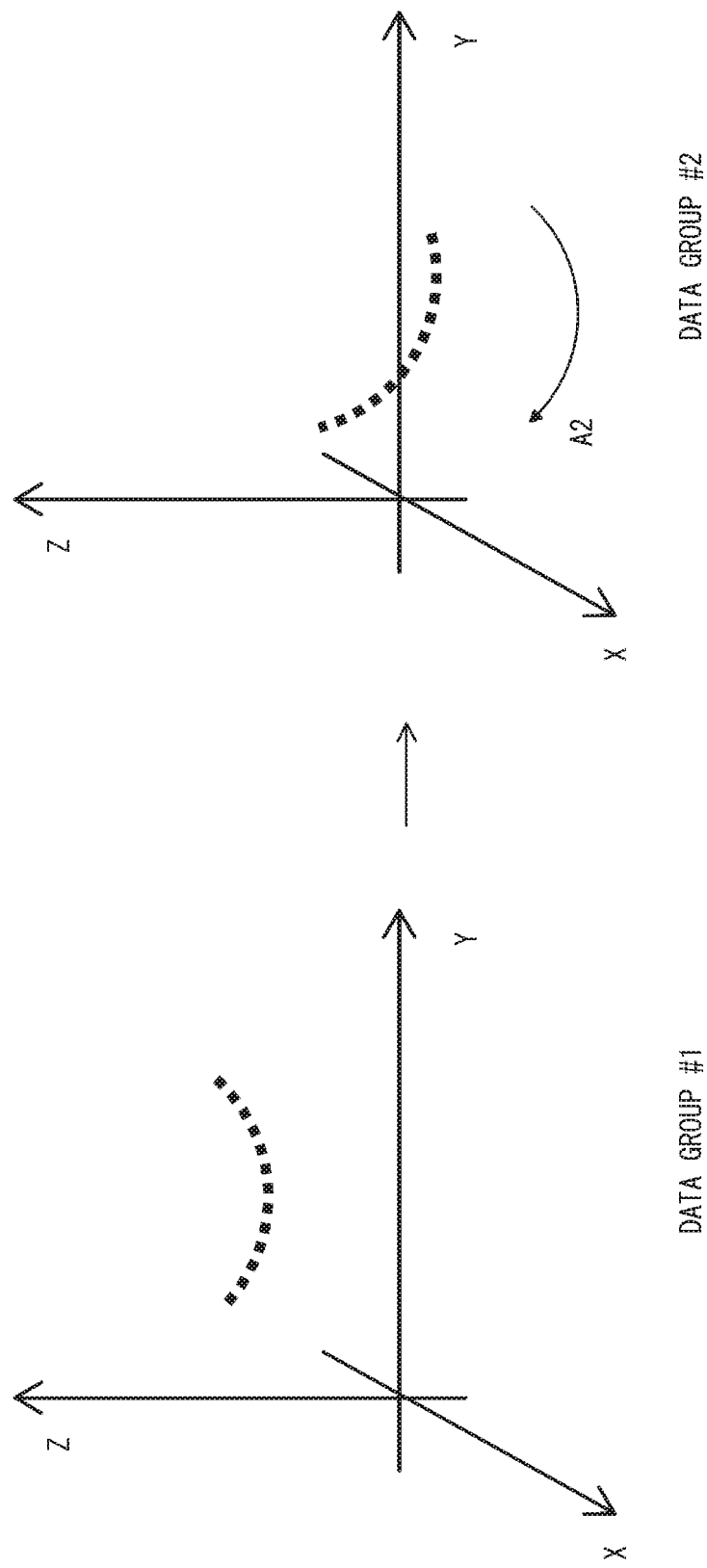
FIG. 14 is a view illustrating coordinate transformation of a data group in consideration of the rotation of an object.

FIG. 14 is a view illustrating coordinate transformation of a data group in consideration of the rotation of the object 90. FIG. 14 shows the case where the object 90 has rotated clockwise (in the direction indicated by the arrow A2) about the roll axis (the axis parallel to the X-axis). In this case, the feature comparison unit 122 may determine whether the similarity (correlation coefficient c') between the shape of a curved line formed by the data group #1 and the shape of a curved line formed by the data group #2 is equal to or more than a predetermined threshold when the data group #1 or the data group #2 is rotated. The similarity (correlation coefficient c') of the shapes may be calculated by the method described earlier in the second example, for example. For the rotation of a data group, the feature comparison unit 122 calculates a slope a1 of the straight line connecting the first coordinate data $(X_1, Y_{11}, Z_{11})$ and the last coordinate data $(X_{1m}, Y_{1m}, Z_{1m})$ in the data group #1. Likewise, the feature comparison unit 122 calculates a slope a2 of the straight line connecting the first coordinate data $(X_{21}, Y_{21}, Z_{21})$ and the last coordinate data $(X_{2n}, Y_{2n}, Z_{2n})$ in the data group #2. Then, the feature comparison unit 122 may determine the degree of rotation when rotating the data group #1 or the data group #2 from a difference between the slope a1 and the slope a2.

Note that, when the object 90 rotates, there is a case where a position that has been detected in the first irradiation area 22 is not detected in the second irradiation area 42, and a position that has not been detected in the first irradiation area 22 is detected in the second irradiation area 42. For example, in FIG. 14, there is a case where a position corresponding to the left part (on the negative side of the Y-axis) of the data group #1 (for example, the left part of the bottom surface of the object 90) is not irradiated with laser light in the second irradiation area 42 and does not appear in the data group #2. In contrast, there is a case where a position corresponding to the right part (on the positive side of the Y-axis) of the data group #2 (for example, the right side surface of the object 90) is not irradiated with laser light in the first irradiation area 22 and does not appear in the data group #1. Thus, the feature comparison unit 122 may determine whether the correlation coefficient c' between at least part of the shape of a curved line formed by the data group #1 and at least part of the shape of a curved line formed by the data group #2 is equal to or more than a predetermined threshold. The feature comparison unit 122 therefore does not need to compare the whole of the data group. The same applies to the case with no consideration of the rotation of the object 90.

Further, in the above-described example embodiments, it is determined to be the same position on the same object when a difference in feature is less than a predetermined threshold (S20 in FIG. 4). On the other hand, the case where, despite that a certain object has passed the first irradiation area 22 and the second irradiation area 42, a difference in feature does not fall below a threshold due to some reasons even if the feature data extracted in the second irradiation area 42 is compared with all the feature data stored in the feature storage unit 112 may be taken into consideration. In this case, the movement parameter of the object 90 may be calculated from the passing position and time where the feature data whose difference from the feature data extracted in the second irradiation area 42 is the smallest among the feature data stored in the feature storage unit 112 is extracted.

Further, the case where there are a plurality of feature data whose difference from the feature data extracted in the second irradiation area 42 is less than a threshold among the feature data stored in the feature storage unit 112 may be taken into consideration. In this case, the movement parameter of the object 90 may be calculated from the passing position and time where the feature data whose difference from the feature data extracted in the second irradiation area 42 is the smallest among the plurality of feature data is extracted.

Further, the case where objects in similar shapes have entered in a group may be taken into consideration. In this case also, there is a possibility that there are a plurality of feature data whose difference from the feature data extracted in the second irradiation area 42 is less than a threshold among the feature data stored in the feature storage unit 112. In this case, the movement parameter of the object 90 may be calculated from the passing position and time where the feature data with the minimum distance between positions where each feature data is extracted in each irradiation area is extracted.

In the above-described example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

An object detection device comprising:

a feature extraction means for extracting features of an object in a plurality of irradiation areas of irradiation light from at least one sensor when the object passes each of the plurality of irradiation areas, the at least one sensor being configured to detect a feature of a part of a surface of the object by applying irradiation light; and a calculation means for calculating a movement parameter related to movement of the object between the plurality of irradiation areas when a difference between the features respectively extracted in the plurality of irradiation areas falls below a predetermined first threshold.

(Supplementary Note 2)

The object detection device according to Supplementary Note 1, further comprising:

a feature comparison means for comparing the features respectively extracted in the plurality of irradiation areas, and determining that the same position on the same object has passed each of the irradiation areas when a difference between the extracted features falls below the predetermined first threshold.

(Supplementary Note 3)

The object detection device according to Supplementary Note 1 or 2, wherein, when a difference between a first feature extracted in a first irradiation area among the plurality of irradiation areas and a second feature extracted in a second irradiation area among the plurality of irradiation areas falls below the first threshold, the calculation means calculates a moving direction of the object between the first irradiation area and the second irradiation area based on a position where the object has passed the first irradiation area when the first feature is extracted and a position where the object has passed the second irradiation area when the second feature is extracted.

(Supplementary Note 4)

The object detection device according to any one of Supplementary Notes 1 to 3, wherein, when a difference between a first feature extracted in a first irradiation area among the plurality of irradiation areas and a second feature extracted in a second irradiation area among the plurality of irradiation areas falls below the first threshold, the calculation means calculates a moving speed of the object between the first irradiation area and the second irradiation area based on a time when and a position where the object has passed the first irradiation area when the first feature is extracted and a time when and a position where the object has passed the second irradiation area when the second feature is extracted.

(Supplementary Note 5)

The object detection device according to any one of Supplementary Notes 1 to 4, wherein the sensor is a three-dimensional sensor, and the extracted feature relates to a shape of the object.

(Supplementary Note 6)

The object detection device according to Supplementary Note 5, wherein the extracted feature corresponds to the number of data indicating each position of the object in the irradiation areas of the sensor, and the calculation means calculates the movement parameter when a difference in the number of data in each of the plurality of irradiation areas falls below the first threshold.

(Supplementary Note 7)

The object detection device according to Supplementary Note 5, wherein the extracted feature corresponds to coordinate data indicating each position of the object in the irradiation areas of the sensor, and the calculation means calculates the movement parameter when a difference in the coordinate data in each of the plurality of irradiation areas falls below the first threshold.

(Supplementary Note 8)

The object detection device according to Supplementary Note 5, wherein the extracted feature corresponds to a size of the object in the irradiation areas of the sensor, and the calculation means calculates the movement parameter when a difference in the size of the object in each of the plurality of irradiation areas falls below the first threshold.

(Supplementary Note 9)

The object detection device according to Supplementary Note 5, wherein the extracted feature corresponds to a normal vector of the object in the irradiation areas of the sensor, and the calculation means calculates the movement parameter when a difference in the normal vector of the object in each of the plurality of irradiation areas falls below the first threshold.

(Supplementary Note 10)

An object detection system comprising:

at least one sensor configured to detect a feature of a part of a surface of an object by applying irradiation light; and the object detection device according to any one of Supplementary Notes 1 to 9.

(Supplementary Note 11)

An object detection method comprising:

extracting features of an object in a plurality of irradiation areas of irradiation light from at least one sensor when the object passes each of the plurality of irradiation areas, the at least one sensor being configured to detect a feature of a part of a surface of the object by applying irradiation light; and calculating a movement parameter related to movement of the object between the plurality of irradiation areas when a difference between the features respectively extracted in the plurality of irradiation areas falls below a predetermined first threshold.

(Supplementary Note 12)

The object detection method according to Supplementary Note 11, comprising:

comparing the features respectively extracted in the plurality of irradiation areas, and determining that the same position on the same object has passed each of the irradiation areas when a difference between the extracted features falls below the predetermined first threshold.

(Supplementary Note 13)

The object detection method according to Supplementary Note 11 or 12, wherein when a difference between a first feature extracted in a first irradiation area among the plurality of irradiation areas and a second feature extracted in a second irradiation area among the plurality of irradiation areas falls below the predetermined first threshold, a moving direction of the object between the first irradiation area and the second irradiation area is calculated based on a position where the object has passed the first irradiation area when the first feature is extracted and a position where the object has passed the second irradiation area when the second feature is extracted.

(Supplementary Note 14)

The object detection method according to any one of Supplementary Notes 11 to 13, wherein, when a difference between a first feature extracted in a first irradiation area among the plurality of irradiation areas and a second feature extracted in a second irradiation area among the plurality of irradiation areas falls below the predetermined first threshold, a moving speed of the object between the first irradiation area and the second irradiation area is calculated based on a time when and a position where the object has passed the first irradiation area when the first feature is extracted and a time when and a position where the object has passed the second irradiation area when the second feature is extracted.

(Supplementary Note 15)

The object detection method according to any one of Supplementary Notes 11 to 14, wherein the sensor is a three-dimensional sensor, and the extracted feature relates to a shape of the object.

(Supplementary Note 16)

The object detection method according to Supplementary Note 15, wherein the extracted feature corresponds to the number of data indicating each position of the object in the irradiation areas of the sensor, and the movement parameter is calculated when a difference in the number of data in each of the plurality of irradiation areas falls below the first threshold.

(Supplementary Note 17)

The object detection method according to Supplementary Note 15, wherein the extracted feature corresponds to coordinate data indicating each position of the object in the irradiation areas of the sensor, and the movement parameter is calculated when a difference in the coordinate data in each of the plurality of irradiation areas falls below the first threshold.

(Supplementary Note 18)

The object detection method according to Supplementary Note 15, wherein the extracted feature corresponds to a size of the object in the irradiation areas of the sensor, and the movement parameter is calculated when a difference in the size of the object in each of the plurality of irradiation areas falls below the first threshold.

(Supplementary Note 19)

The object detection method according to Supplementary Note 15, wherein the extracted feature corresponds to a normal vector of the object in the irradiation areas of the sensor, and the movement parameter is calculated when a difference in the normal vector of the object in each of the plurality of irradiation areas falls below the first threshold.

(Supplementary Note 20)

A non-transitory computer-readable medium storing a program causing a computer to perform:

a step of extracting features of an object in a plurality of irradiation areas of irradiation light from at least one sensor when the object passes each of the plurality of irradiation areas, the at least one sensor being configured to detect a feature of a part of a surface of the object by applying irradiation light; and a step of calculating a movement parameter related to movement of the object between the plurality of irradiation areas when a difference between the features respectively extracted in the plurality of irradiation areas falls below a predetermined first threshold.

REFERENCE SIGNS LIST

1 OBJECT DETECTION DEVICE
2 FEATURE EXTRACTION UNIT
4 CALCULATION UNIT
10 OBJECT DETECTION SYSTEM
20 FIRST SENSOR
22 FIRST IRRADIATION AREA
40 SECOND SENSOR 40
42 SECOND IRRADIATION AREA
90 OBJECT
100 OBJECT DETECTION DEVICE
110 FIRST FEATURE EXTRACTION UNIT
112 FEATURE STORAGE UNIT
120 SECOND FEATURE EXTRACTION UNIT
122 FEATURE COMPARISON UNIT
130 DIRECTION CALCULATION UNIT
132 SPEED CALCULATION UNIT

The invention claimed is:

1. An object detection device comprising:
hardware, including a processor and memory;
a feature extraction unit implemented at least by the hardware and configured to extract features of an object in a plurality of irradiation areas of irradiation light from at least one sensor when the object passes each of the plurality of irradiation areas, the at least one sensor being configured to detect a feature of a part of a surface of the object by applying irradiation light; and
a calculation unit implemented at least by the hardware and configured to calculate a movement parameter related to movement of the object between the plurality of irradiation areas when a difference between the features respectively extracted in the plurality of irradiation areas falls below a predetermined first threshold.

2. The object detection device according to claim 1, further comprising:
a feature comparison unit implemented at least by the hardware and configured to compare the features respectively extracted in the plurality of irradiation areas, and determine that the same position on the same object has passed each of the irradiation areas when a difference between the extracted features falls below the predetermined first threshold.

3. The object detection device according to claim 1, wherein, when a difference between a first feature extracted in a first irradiation area among the plurality of irradiation areas and a second feature extracted in a second irradiation area among the plurality of irradiation areas falls below the first threshold, the calculation unit calculates a moving direction of the object between the first irradiation area and the second irradiation area based on a position where the object has passed the first irradiation area when the first feature is extracted and a position where the object has passed the second irradiation area when the second feature is extracted.

4. The object detection device according to claim 1, wherein, when a difference between a first feature extracted in a first irradiation area among the plurality of irradiation areas and a second feature extracted in a second irradiation area among the plurality of irradiation areas falls below the first threshold, the calculation unit calculates a moving speed of the object between the first irradiation area and the second irradiation area based on a time when and a position where the object has passed the first irradiation area when the first feature is extracted and a time when and a position where the object has passed the second irradiation area when the second feature is extracted.

5. The object detection device according to claim 1, wherein
the sensor is a three-dimensional sensor, and
the extracted feature relates to a shape of the object.

6. The object detection device according to claim 5, wherein
the extracted feature corresponds to the number of data indicating each position of the object in the irradiation areas of the sensor, and
the calculation unit calculates the movement parameter when a difference in the number of data in each of the plurality of irradiation areas falls below the first threshold.

7. The object detection device according to claim 5, wherein
the extracted feature corresponds to coordinate data indicating each position of the object in the irradiation areas of the sensor, and
the calculation unit calculates the movement parameter when a difference in the coordinate data in each of the plurality of irradiation areas falls below the first threshold.

8. The object detection device according to claim 5, wherein
the extracted feature corresponds to a size of the object in the irradiation areas of the sensor, and
the calculation unit calculates the movement parameter when a difference in the size of the object in each of the plurality of irradiation areas falls below the first threshold.

9. The object detection device according to claim 5, wherein
the extracted feature corresponds to a normal vector of the object in the irradiation areas of the sensor, and
the calculation unit calculates the movement parameter when a difference in the normal vector of the object in each of the plurality of irradiation areas falls below the first threshold.

10. An object detection system comprising:
at least one sensor configured to detect a feature of a part of a surface of an object by applying irradiation light; and
the object detection device according to claim 1.

11. An object detection method comprising:
extracting features of an object in a plurality of irradiation areas of irradiation light from at least one sensor when the object passes each of the plurality of irradiation areas, the at least one sensor being configured to detect a feature of a part of a surface of the object by applying irradiation light; and
calculating a movement parameter related to movement of the object between the plurality of irradiation areas when a difference between the features respectively extracted in the plurality of irradiation areas falls below a predetermined first threshold.

12. The object detection method according to claim 11, comprising:
comparing the features respectively extracted in the plurality of irradiation areas, and determining that the same position on the same object has passed each of the irradiation areas when a difference between the extracted features falls below the predetermined first threshold.

13. The object detection method according to claim 11, wherein when a difference between a first feature extracted in a first irradiation area among the plurality of irradiation areas and a second feature extracted in a second irradiation area among the plurality of irradiation areas falls below the predetermined first threshold, a moving direction of the object between the first irradiation area and the second irradiation area is calculated based on a position where the object has passed the first irradiation area when the first feature is extracted and a position where the object has passed the second irradiation area when the second feature is extracted.

14. The object detection method according to claim 11, wherein, when a difference between a first feature extracted in a first irradiation area among the plurality of irradiation areas and a second feature extracted in a second irradiation area among the plurality of irradiation areas falls below the predetermined first threshold, a moving speed of the object between the first irradiation area and the second irradiation area is calculated based on a time when and a position where the object has passed the first irradiation area when the first feature is extracted and a time when and a position where the object has passed the second irradiation area when the second feature is extracted.

15. The object detection method according to claim 11, wherein
the sensor is a three-dimensional sensor, and
the extracted feature relates to a shape of the object.

16. The object detection method according to claim 15, wherein
the extracted feature corresponds to the number of data indicating each position of the object in the irradiation areas of the sensor, and
the movement parameter is calculated when a difference in the number of data in each of the plurality of irradiation areas falls below the first threshold.

17. The object detection method according to claim 15, wherein
the extracted feature corresponds to coordinate data indicating each position of the object in the irradiation areas of the sensor, and
the movement parameter is calculated when a difference in the coordinate data in each of the plurality of irradiation areas falls below the first threshold.

18. The object detection method according to claim 15, wherein
the extracted feature corresponds to a size of the object in the irradiation areas of the sensor, and
the movement parameter is calculated when a difference in the size of the object in each of the plurality of irradiation areas falls below the first threshold.

19. The object detection method according to claim 15, wherein
the extracted feature corresponds to a normal vector of the object in the irradiation areas of the sensor, and
the movement parameter is calculated when a difference in the normal vector of the object in each of the plurality of irradiation areas falls below the first threshold.

20. A non-transitory computer-readable medium storing a program causing a computer to perform:
a step of extracting features of an object in a plurality of irradiation areas of irradiation light from at least one sensor when the object passes each of the plurality of irradiation areas, the at least one sensor being configured to detect a feature of a part of a surface of the object by applying irradiation light; and
a step of calculating a movement parameter related to movement of the object between the plurality of irradiation areas when a difference between the features respectively extracted in the plurality of irradiation areas falls below a predetermined first threshold.

* * * * *